(12) United States Patent
Meyer et al.

(10) Patent No.: US 6,263,496 B1
(45) Date of Patent: Jul. 17, 2001

(54) SELF MODIFYING SCENE GRAPH

(75) Inventors: Thomas W. Meyer, Encinitas; Scott D. Kessler, San Diego; Darren H. New, San Diego, all of CA (US)

(73) Assignee: Amazing Media, Inc., Fairfax, VA (US)

( * ) Notice: Subject to any disclaimer, the term of this patent is extended or adjusted under 35 U.S.C. 154(b) by 0 days.

(21) Appl. No.: 09/017,884

(22) Filed: Feb. 3, 1998

(51) Int. Cl.[7] .................................................. G06F 9/445

(52) U.S. Cl. ................... 717/11; 717/1; 717/2; 345/474; 345/974

(58) Field of Search ...................... 717/11, 2, 8; 345/473, 345/474, 977

(56) References Cited

U.S. PATENT DOCUMENTS

| | | |
|---|---|---|
| 3,594,759 | 7/1971 | Smura . |
| 4,545,032 | 10/1985 | Mak . |
| 4,670,851 | 6/1987 | Murakami et al. . |
| 4,707,738 | 11/1987 | Ferre et al. . |
| 4,980,857 | 12/1990 | Walter et al. . |
| 5,261,041 | 11/1993 | Susman . |
| 5,303,334 | 4/1994 | Snyder et al. . |
| 5,655,067 | 8/1997 | Takahashi et al. . |
| 5,729,748 | 3/1998 | Robbins et al. . |
| 5,787,452 | 7/1998 | McKenna . |
| 5,821,519 | 10/1998 | Lee et al. . |

(List continued on next page.)

FOREIGN PATENT DOCUMENTS

| | | |
|---|---|---|
| 0594304 | 4/1994 | (EP) . |
| 0611124 | 8/1994 | (EP) . |
| 0757332 | 2/1997 | (EP) . |
| WO 96/04605 | 2/1996 | (WO) . |

OTHER PUBLICATIONS

Seitz et al., "A Practical Adaptive Image Compression Technique Using Visual Criteria for Still–Picture Transmission with Electronic Mail," IEEE Transactions on Communications, vol. 38, No. 7, pp. 947–949, Jul. 1990.

Delozier, E.P., "Encoders, Decoders, Compressors, Decompressors, Viewers, and Helper Utilities for an Internet Tool Box," Medical Reference Services Quarterly, vol. 15, No. 3, pp. 57–62, Fall 1996.

T. Rictchey; "Java!: Chapter 2 An Introduction to Java", and "Chapter 7 Getting it Together —Classes, Interfaces, and Packages" and Chapter 11 Using the Browser and AWT Class Library *New Riders Publishing* (© 1995) pp. 27–54, 163–165, 268–269.

Reid et al., "Second–Generation Image Coding: An Overview", ACM computing Surveys, vol. 29, No. 1, pp. 3–29, Mar. 1997.*

M. Arikawa et al., "Dynamic LoD for QoS Management in the Next Generation VRML," Proceedings of the International Conference on Multimedia Computing and Systems, Jun. 17 1996, pp. 24–27.

Digital Equipment Corporation, "PDP11 Processor Handbook," pp. 5–1 to 5–9, 1973.

*Primary Examiner*—Kakali Chaki
*Assistant Examiner*—Ted T. Vo
(74) *Attorney, Agent, or Firm*—Cooley Godward LLP

(57) ABSTRACT

A system and method for efficiently coding an animation sequence, utilizes a single instance of an encoded function, having an operation code specifying a function and arguments to be used in carrying out said function. A list of one or more arguments associated with the function is created for each animation sequence in which the function is called. At least one of the arguments is copied from the list into arguments of the encoded function. As a result, arguments in the list can be altered to alter the animation sequence during subsequent iterations without having to recreate an additional instance of the encoded function.

40 Claims, 20 Drawing Sheets

U.S. PATENT DOCUMENTS

| | | |
|---|---|---|
| 5,838,296 | 11/1998 | Butler et al. . |
| 5,867,175 * | 2/1999 | Katzenberger et al. .............. 345/473 |
| 5,896,139 * | 4/1999 | Strauss . |
| 5,949,425 | 9/1999 | Willis . |
| 5,969,770 * | 10/1999 | Horton .................................. 348/569 |
| 5,974,254 | 10/1999 | Hsu . |
| 5,995,107 | 11/1999 | Berteig et al. . |

* cited by examiner

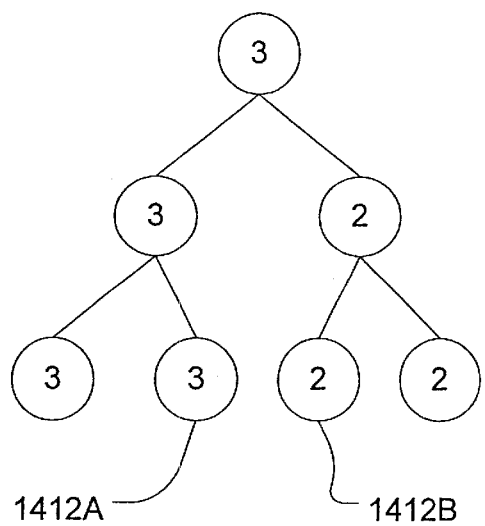
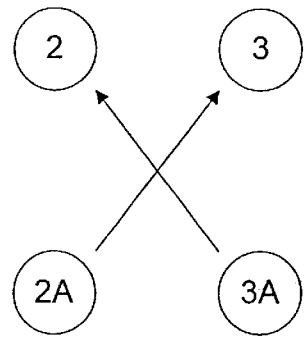
Fig. 17A    Fig. 17E
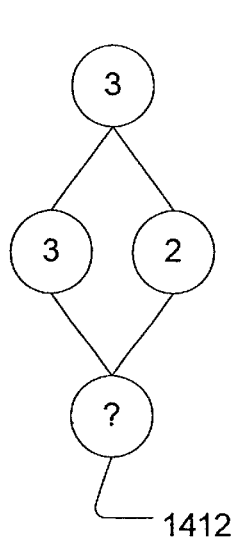
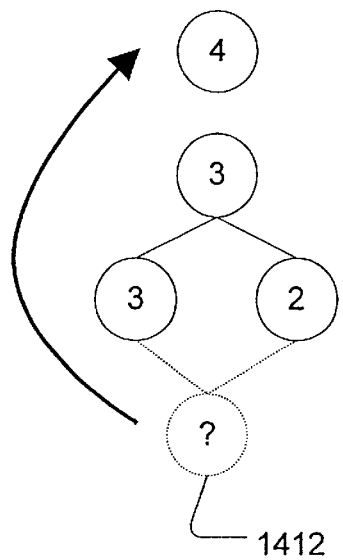
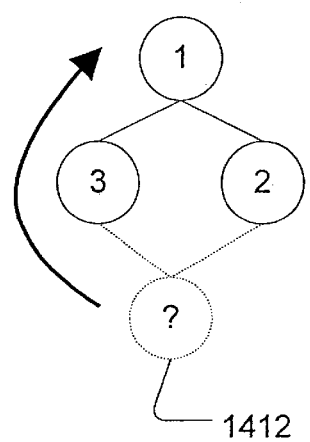
Fig. 17B    Fig. 17C    Fig. 17D

SELF MODIFYING SCENE GRAPH

RELATED APPLICATIONS

The present application is related to copending U.S. patent application Ser. No. To Be Assigned 09/017,896, titled "System and Method For Encoding A Scene Graph," No. To Be Assigned, 09.017,897 titled "System and Method For Incrementally Loading A Scene Graph," and No. To Be Assigned, 09/017,894 titled "System and Method For Disambiguating Scene Graph Loads," each of which are filed concurrently herewith and each of which are incorporated herein by reference in their entirety.

BACKGROUND OF THE INVENTION

1. Field of the Invention

The present invention relates generally to animated scenes, and more particularly to a system, and method for rendering an animated scene on a computer.

2. Related Art

The Internet is rapidly becoming a staple medium for today's business and industry. Businesses of all types and sizes rely on the Internet as a tool for promoting their business and for making their business better known to the public. Businesses that rely on the Internet use it as a medium for providing the general public with information about their company and the products and services they offer. Many businesses even sell their products over the Internet.

The Internet, however, is not restricted to use by businesses. In fact, governmental organizations, clubs, special interest groups, other organizations and even individuals are among the many diverse parties who rely on the Internet to help disseminate information about their organization or about themselves.

As more and more parties have posted web pages, competition among them has grown. In the early stages of its evolution, the "high-tech" Internet web page included text accompanied by still photos. However, as advertisers have upped the ante to capture the users' attention, web pages have evolved dramatically. To make their sites more appealing to users, contemporary Internet sites include animated multi-color graphics and accompanying video and sound tracks.

However, in Internet applications as well as other environments, animated graphics and associated video and sound tracks do not come without a price. These enhanced features are typically resource-intensive. That is, they usually require a relatively significant resource pool to operate quickly and effectively. One such resource is communications bandwidth, and another is processing power. Providing an animated graphics scene to a user's web browser requires a fair amount of bandwidth. As the complexity of the animations increases, the size of the files required to provide the animation to the user tends to increase as well. Consequently, the time required to download such animations to a user's computer increases. Although communication speeds across the Internet and into a user's home or office are increasing, the communications technology typically cannot keep up with the demands of contemporary animations. Furthermore, not every user has the latest and fastest communications interface available to them. Thus, the resolution, complexity and speed of an animation provided with a web page are often limited by the bandwidth of the communications interfaces.

Additionally, animations are computed and rendered by the user's computer. As such, the programmer cannot be assured of a particular level of processing power to create and display the animation. In fact, while some users have the latest and fastest machines to browse the web, others are still using machines which are one or more generations old, and which therefore do not have the processing power to quickly render animated scenes.

Some conventional techniques are utilized for optimizing the creation and rendering of animated scenes. One conventional technique, referred to as PHIGS, provides some optimization in that it allows the creation and reuse of objects through scene graphs. VRML is another technique which utilizes a scene graph for generating animated scenes. At the highest level of abstraction, VRML is a way for objects to read and write themselves. The Inventor® product available from Silicon Graphics, Inc., of Mountain View, Calif., is a predecessor to VRML. However, even with PHIGS and VRML, there are inherent inefficiencies which can slow down the delivery or rendering of an animated scene. The designers of Inventor®, VRML and PHIGS required a relatively large engine to implement and execute scenes.

SUMMARY OF THE INVENTION

The present invention is directed toward a system and method for the efficient handling of animated scenes in an extensible environment. Preferably, in accordance with one embodiment of the invention, the invention is directed toward the efficient handling of animated scenes for the downloading and execution of the animated scenes in an interactive manner at a user's computer at a remote location. An example environment in which this embodiment can be applied is the Internet. For example, in this embodiment, web page authors often provide animated sequences to be downloaded to a user's computer. The user can interact with the animated sequences to cause additional downloads to be made.

In accordance with one embodiment of the invention, the animated sequence is provided in a highly extensible animation language such that the sequence can easily be run on any of a variety of computers. Preferably, in this embodiment, the animated sequence is re-written utilizing one or more custom opcodes. These opcodes provide for efficient techniques for rendering the animated scenes on the user's computer. As such, the scenes are acceptable for use with a broader range of processors having a broad range of processing powers. An advantage of this aspect of the invention is that it allows the animated sequence to be more accessible to a broader range of customers or users.

In accordance with another aspect of the invention, the animated sequence is divided into a plurality of pieces which are successively loaded onto the user's machine. These pieces are referred to as loads. The loads can include functionality as well as any data necessary to render a portion of the animated scene on the user's computer. Proper apportionment of functionality and data to the various loads allows for an efficient process for downloading the data to the user's computer. For example, in one embodiment, the initial load provided to the user's computer includes a minimum set of functionality and data needed to initially render the animated scene on the user's computer. Subsequent loads provide only the additional functionality and data needed to provide whatever additional animation was requested. Preferably, to optimize the downloading of an animated sequence, each load includes only that data and functionality that is necessary to animate the part of the scene intended for that load.

For example, consider a sample animation which is a banner advertisement having an initial animated sequence. The initial animated sequence includes an animated scene and overlaid with a corporate logo. In this example, when an event occurs (e.g., the user interacts with the banner ad), buttons are added to the animation such that the user can make a selection. Depending on the selection made, a form may be downloaded or a different animated scene may be downloaded. According to one embodiment for implementing this example, the sample animation may be provided in four loads. The first load includes only the functions and data necessary to render the initial animated scene on the user's machine. The second load includes only the functions and data necessary to add the buttons to the animation. The functions and data necessary for the original animation and company logo do not have to be re-loaded because they were already provided in the first load. The third load includes only the functionality and data needed to draw the form and accept responses to the form, while the fourth load includes only the functionality and data needed to render the new animated scene. Any functions or data provided in the first load, which could also be used to render the new animated scene do not need to be provided in the fourth load. Because user input may determine whether the form or the new animated sequence are downloaded, the temporal order of the third and fourth loads is not fixed.

One feature of the invention is that a nanokernel can be created and provided with the first load. In this embodiment, the nanokernel provides the minimum set of functionality needed to render the initial animated scene. Because the nanokernel is defined with minimal functionality, the times for loading and executing the scene are minimized.

Another aspect of the invention provides efficient coding techniques to avoid inefficiencies associated with conventional stack-based architectures. In accordance with this aspect, special op-codes can be defined which allow efficient manipulation of data for graphics/animation operations. This aspect is now described according to one embodiment. First, an animation sequence is created. The sequence can be created using, for example, an off the shelf authoring tool. Once the sequence is created, it can be translated into a language that is better suited for composing elements and building scenes out of primitives. This language is referred to in this document as a scene definition language. In some embodiments described herein, a scene definition language is referred to as "VDL."

The scene definition language is compiled into opcodes for interpretation by the nanokernel. The opcodes and the nanokernel files are converted into a highly extensible language suitable for operation on a variety of end-user machines.

According to another aspect of the invention, the opcodes can be represented as arrays. More particularly, according to one embodiment the opcodes can be represented as an array of array of integers where each subarray can be of different length and each subarray represents a single opcode with its arguments. In this embodiment, an opcode and its arguments can be represented by a subarray of integers having a first integer representing the opcode, and integers representing the arguments themselves. The array of integers can be coded and converted to a text file. This can be accomplished, for example, using a simple mapping technique. The text file can be coded utilizing coding techniques such as, for example, UTF-8. As a result, the alphanumerics can be compressed using a variable length compression yielding resultant efficiencies. In yet another alternative, the array can be implemented as a single array of integers. This array can include a length count followed by the number of integers. There can be one or more subsequent length counts followed by a corresponding number of integers.

According to yet another aspect of the invention, each node in an animated scene can be assigned to a particular load by a developer, or a routine can be implemented for automatically assigning load numbers to one or more of a plurality of nodes. Thus, according to one aspect of the invention, a minimal set of nodes are designated as belonging to one of a plurality of loads and remaining nodes are determined during compilation. In one embodiment, the nodes are examined to determine which nodes are unmarked. When a unmarked node is found, the load designation of its parent node or nodes is examined. If only one parent node exists for the unmarked node, the unmarked node is assigned to the same load as the parent and the process continues. If there are two parents to the unmarked node and each parent is assigned to a different load, an ambiguity may exist. In one embodiment, if either parent is assigned to load 1, there is no ambiguity and the unmarked node is also assigned to load 1. If one of the parents is not assigned to load 1, an ambiguity exists and is preferably resolved or an error is flagged.

The resolution can be brought about through a number of different techniques. According to one technique, the ambiguous node is duplicated for each parent node. According to another technique, the functionality of the ambiguous node is relocated to a node associated with the first load such that that functionality will be present regardless of which subsequent load requires it. According to yet another technique, the functionality from the ambiguous node is transferred to a node which precedes each of the parent nodes such that the functionality will be available for the ambiguous node regardless of whether one or the other of the parent nodes is loaded first. According to still another technique, when an ambiguous node is found an error is flagged and the developer is asked to resolve the ambiguity by either assigning a load or taking some alternative action to solve the problem. According to yet another technique the routine tracks whether the functionality from the ambiguous node was already loaded with one of the parent nodes. According to this technique, new nodes are created outlining the functionality which would be needed if one or the other of the parents is downloaded first. In this manner, regardless of which parent is downloaded first, the required functionality can be subsequently downloaded with the previously ambiguous node.

Further features and advantages of the invention as well as the structure and operation of various embodiments of the invention are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit(s) of a reference number identifies the drawing in which the reference number first appears.

FIGS. 17A through 17E illustrate five example scenarios which can be implemented to resolve an ambiguity uncovered in designating loads.

DETAILED DESCRIPTION OF THE INVENTION

1. Introduction and Overview of the Invention

The present invention is directed to a system and method for providing animated scenes to a customer or other user. According to the invention, any one or a combination of a plurality of techniques can be implemented to enhance the performance on a user's machine. One technique involves the use of a nanokernel. In this embodiment, the developer defines an initial scene to be animated. From the scene, an engine (i.e., nanokernel) and a minimum set of instructions needed to actually render the initial animated scene are derived. These can be determined based on what elements make up the scene. In other words, the nanokernel and minimum instruction set are determined based on what elements are required to render the animated scene. Preferably, the nanokernel and minimum instruction set include only those elements necessary to render the initial animated scene.

The nanokernel and minimal instruction set are downloaded to the user's machine for execution. One advantage of this approach is that the full animation sequence does not need to be downloaded initially. A further advantage is achieved because the nanokernel only needs to provide the functionality required to execute the minimal instruction set. As a result, the size and complexity of the nanokernel can be controlled.

A second technique involves the use of a compressed set of opcodes used in rendering the scene. These opcodes define operations which allow a computer to quickly and efficiently render animated scenes.

Figure 1:
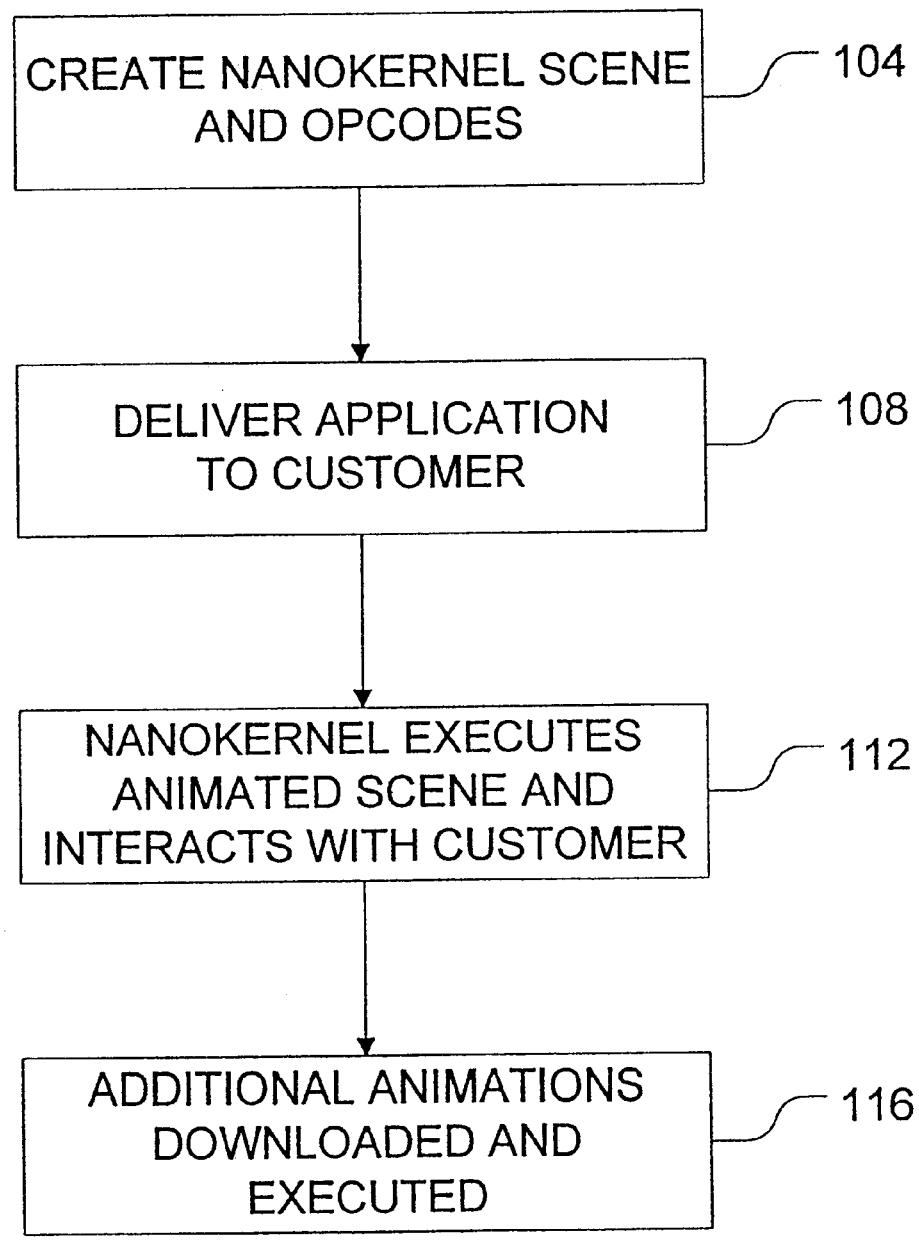
FIG. 1 is an operational flow diagram generally illustrating a process of providing an animated scene to a user according to one embodiment of the invention.

FIG. 1 is an operational flow diagram generally illustrating a process for providing an animated scene to a user according to one embodiment of the invention. Referring now to FIG. 1, in a step 104 a nanokernel is created. As briefly described above, the nanokernel provides the functionality needed to execute the instructions to render the animated scene on the user's computer. In a preferred embodiment, the nanokernel includes only the minimum functionality required to render the initial animated scene to be delivered to the user. A reduced instruction set needed to render the initial animated scene on the user's computer is defined. Preferably, the reduced instruction set provides only the instructions necessary to render an initial animated scene. In one embodiment, the nanokernel can include routines, opcode and media.

In a step 108, the nanokernel and the reduced instruction set are delivered to the user. Preferably, the invention is implemented for Internet applications. As such, in a preferred embodiment, the nanokernel and reduced instruction set are delivered along with a web page to the user via the Internet.

In a step 112, the nanokernel on the user's computer executes the reduced instruction set, rendering the animated scene on the user's computer.

In a step 116, further interactions by the user cause additional data items to be downloaded to his or her computer. Specifically, additional functionality can be downloaded to supplement the capabilities of the nanokernel as can additional instructions for creating additional animations or for augmenting the current animation.

Figure 2:
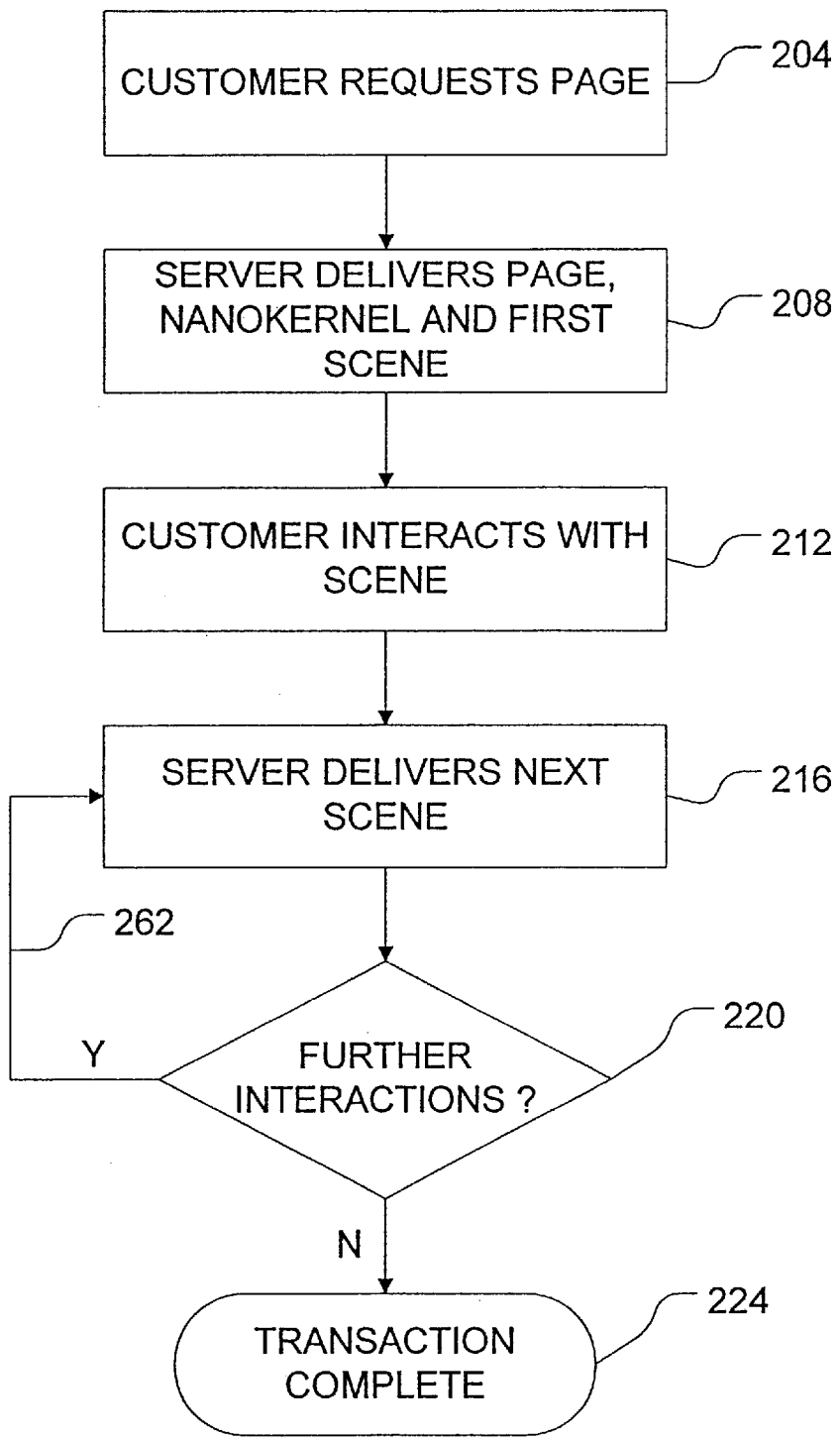
FIG. 2 is an operational flow diagram illustrating an application of the invention according to one Internet embodiment.

The invention according to one Internet embodiment is now described with reference to FIG. 2. In a step 204 the user browsing on the Internet requests a web page from a server. In a step 208, the server delivers the web page along with a first scene and a nanokernel to render the first scene. The user's computer receives the nanokernel and the animation sequence and displays the animation sequence to the user.

In a step 212, the user interacts with the scene. In one embodiment, the interaction can be a simple action such as the user moving the mouse pointer over the scene (i.e., mousing onto the scene). In alternative embodiments, the interaction can involve moving the mouse pointer over a specific portion of the scene, clicking on the scene or a button or other feature on the scene, a keyboard event, the passage of a timeout period, or some other event.

As a consequence of the user's interaction, the server delivers the next load which may contain a new functionality, new animations, or any combination of these or other objects the nanokernel supports. This occurs in a step 216. In this step, the server can deliver additional routines or instructions for generating a new animated scene or for providing additional animation to the current scene. If additional execution capabilities are required to render this new scene or supplemental animation, enhancements to the nanokernel are downloaded as well. The new or supplemental animation can now be rendered by the user's computer and displayed on the user's monitor.

If the user requests additional animation or further interacts with the scene in a manner which leads to additional animation, step 216 is repeated. This is illustrated by step 220 and flow line 262. Where no further animation is requested, the transaction is completed as illustrated by step 224.

2. Compilation

Figure 3:
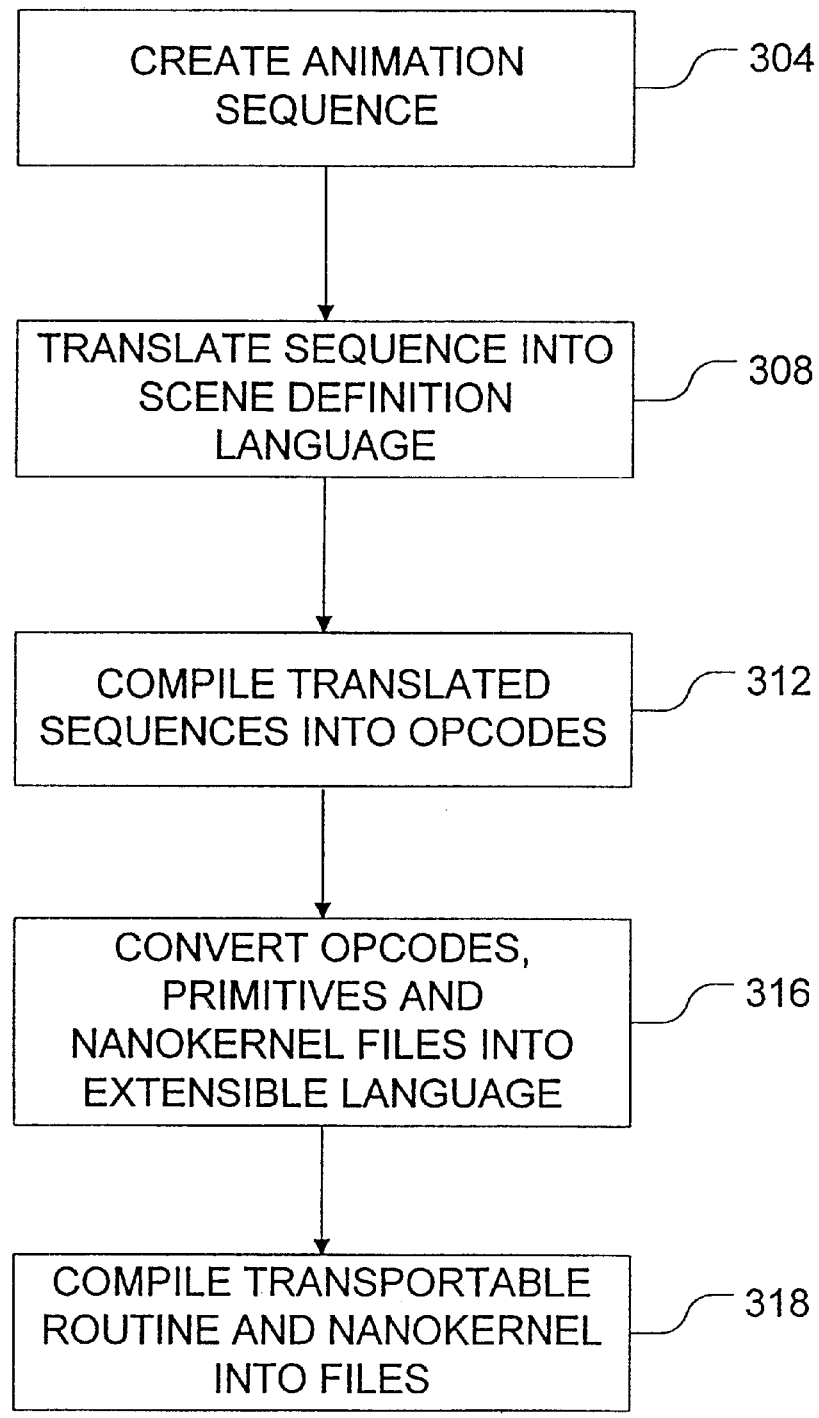
FIG. 3 is an operational flow diagram illustrating a compilation process according to one embodiment of the invention.

In one embodiment, the animated scene to be delivered to the user for viewing is created and then compiled to make use of an efficient set of opcodes for rendering. FIG. 3 is an operational flow diagram illustrating the compilation process according to one embodiment of the invention. Referring now to FIG. 3, in a step 304 a developer creates the animation sequence using an authoring tool. The animation sequence developed in this step is preferably the complete sequence to be viewed, including an initial sequence and any additions or follow-on sequences. In one embodiment, the authoring tool used is Liquid Motion Pro®, available from Microsoft, although other authoring tools can be used.

In a step 308, the animation sequence is translated into a language, such as, for example, a scene definition language used to describe the animation sequence. In one embodiment, the scene definition language is a language designed for composing elements and building scenes out of lower-level primitives.

In a step 312, the scene definition language is compiled. In this step the scene definition language file is translated, along with other libraries, (such as, for example, definition primitives and function libraries) into opcodes for interpretation by the nanokernel. These opcodes are preferably a highly compressed set of opcodes which provide for efficient rendering of animated scenes. Examples of these opcodes are described in greater detail below.

In a step 316, the opcodes, associated primitives and the nanokernel files are converted into an extensible or transportable language such as, for example, Java. More specifically speaking, in one embodiment the libraries are translated and placed into the nanokernel, which is written in the extensible language. The implementation language that defines the opcodes can change, but the opcodes themselves remain the same. As a result of this step, the engine and the animation sequence can be downloaded and run on any of a large number of different user computers.

In a step 318, the transportable routine and nanokernel can be compiled into files such as, for example, CLASS files for inclusion on a web page as an applet. Once the CLASS files are on a web server, the user can view the page.

Figure 4:
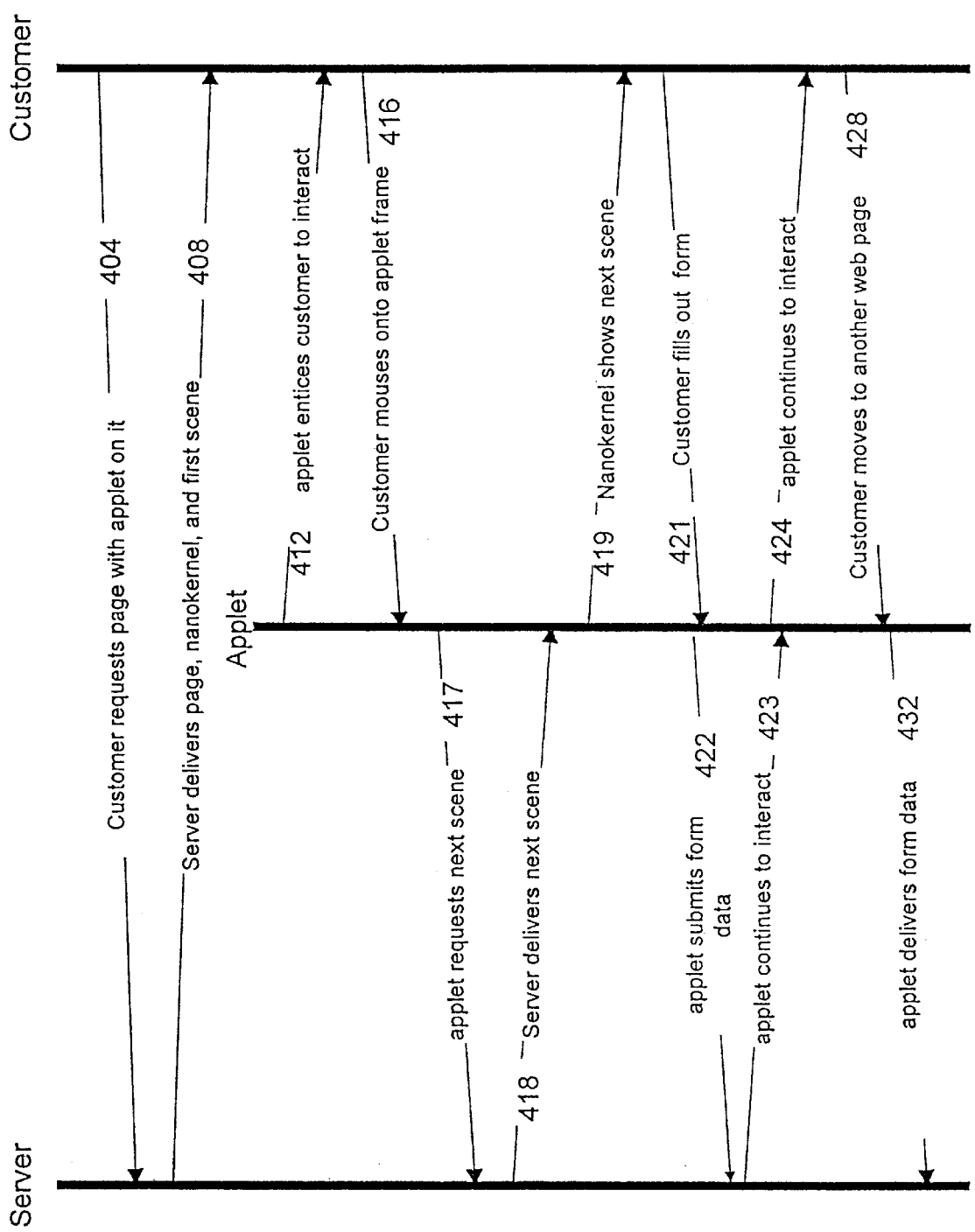
FIG. 4 is a communication diagram illustrating an interaction between a customer and a server in viewing an animated scene according to one embodiment of the invention.

FIG. 4 is a communication diagram illustrating the interaction between the user and the server in viewing the animated scene. According to flow line 404, the user requests a web page having an animated scene associated therewith. The server, in turn, delivers the web page, the nanokernel and the first animated scene as illustrated by flow line 408. The animated scene entices the user to interact with the applet as illustrated by flow line 412.

Once the user interacts with the scene, such as, for example, through mouse motion or clicking, the applet requests the next scene or an animation enhancement which is delivered by the server and rendered by the nanokernel on the user's computer. This is as illustrated by flow lines 416, 417, 418 and 419. The rendering can include showing animations, playing music and so on. The communications associated with flow lines 416, 417, 418 and 419 continue as the user continues to interact with the scene and request additional animation.

Additionally, in the case of on-line shopping or other applications where information is requested of the user, the user can be provided with forms which are filled out on line and processed by the applet. This is illustrated by communication lines 421, 422, 423 and 424. As the user continues this interaction, more scenes may be loaded dynamically, allowing the overall animation to be as complex as desired without introducing unacceptable delays.

In one embodiment, each interaction is recorded and can be posted back to the web page periodically or when the user moves from the web page. This is illustrated by flow lines 428, 432. Interactions with the applet can be tracked as closely as desired by the web page administrator to allow fine tuning of the animation sequences. For example, the developer may wish to divide the animation sequence downloads differently or provide additional divisions based on typical user interactions.

Figure 5:
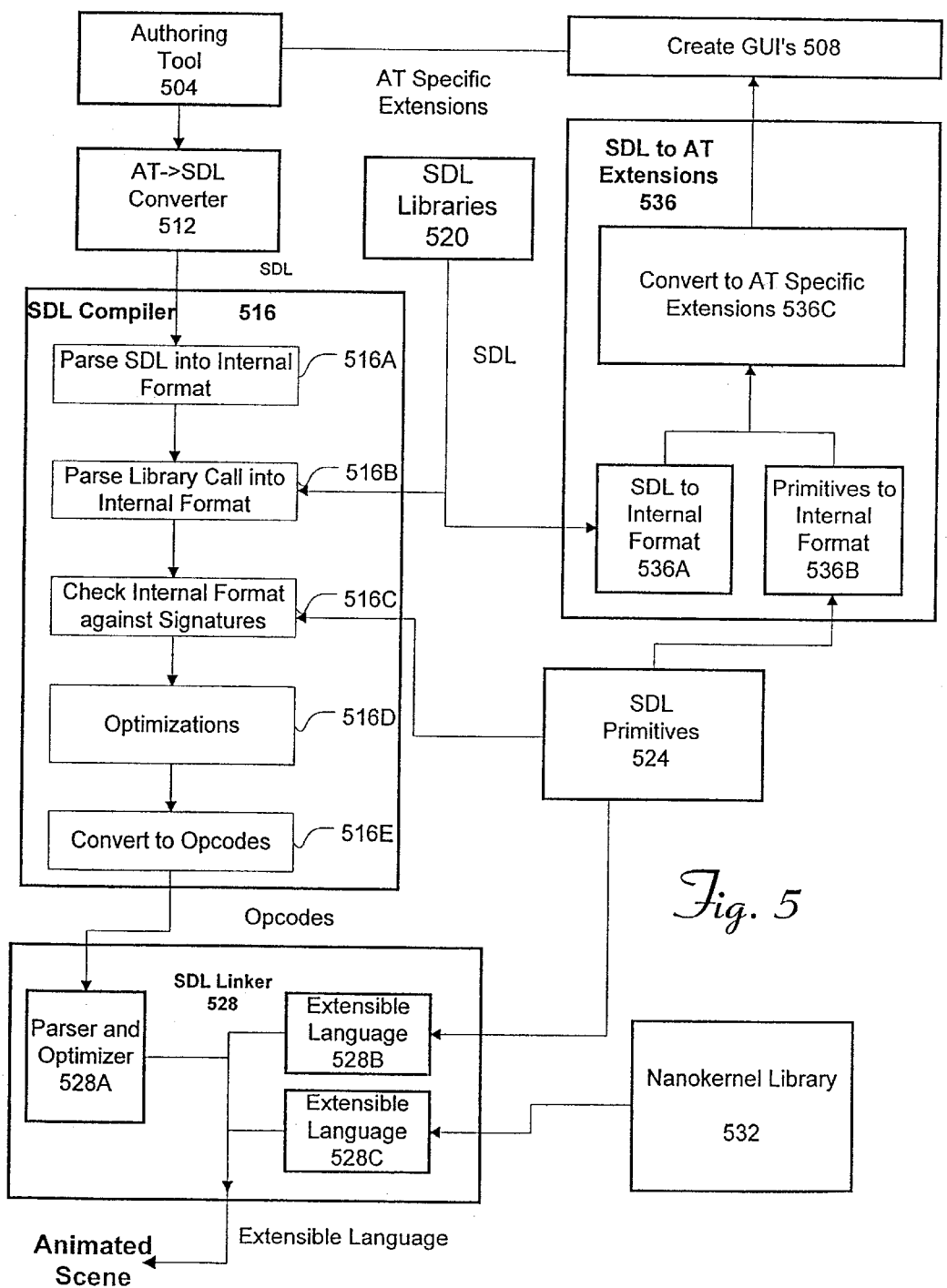
FIG. 5 is an operational flow diagram illustrating a process by which an animated scene written using an authoring tool can be compiled for execution by a nanokernel according to one embodiment of the invention.

FIG. 5 is an operational flow diagram illustrating a process by which an animated scene written using an authoring tool can be compiled for efficient execution by a nanokernel according to one embodiment of the invention. In a step 504, a developer uses an authoring tool to create the animated scene. The animated scene can include animated graphics or video as well as an accompanying audio track. The animated graphics can be a simple animation and can range to more complex animations including the animation of objects using lighting, shading, texture mapping and other graphics techniques. In one embodiment the authoring tool used is Liquid Motion Pro®. However in alternative embodiments, alternative authoring tools can be utilized to generate the scene. The developer can use automation tools specific graphical user interfaces (GUIs) which can be created from the automation-tool-specific extensions or using other GUI creation technique. This is illustrated by a step 508.

In a step 512, the animated scene created using the authoring tool is converted into a scene definition language. The scene definition language is used to compose atomic actions into a scene where the atomic actions are defined in the nanokernel or as definition language primitives. One example embodiment of a suitable scene definition language is described in more detail below, although alternative scene definition languages can be implemented to best suit a particular application. As described above with reference to FIG. 3, the scene definition language is compiled and translated into opcodes for interpretation by the nanokernel. This is illustrated by step 516. In the example embodiment illustrated in FIG. 5, the compilation step 516 includes five steps 516A, 516B, 516C, 516D, and 516E. In a step 516A, the scene definition language is parsed into an internal format. In this preferred embodiment, this internal format is a parse-tree representation of the scene definition language file. Preferably, anything in this internal format can be represented in the scene definition language and vice-versa. This format is used internally by the compiler to compile the scene definition language into opcodes.

In a step 516B the function calls in the scene definition language are checked to determine the type of function call. If a library call is present, that function call is parsed into the internal format and inserted into the main internal format. Scene definition language libraries are defined at step 520.

In a step 516C the internal format is type checked against primitive signatures to insure that there are no unresolved references. If an unresolved reference should result, an error flag is set. Scene definition language (SDL) primitives are defined in a step 524 and their signatures provided to the compiler as illustrated by flow line 562.

In a step 516D, any optimizations in the SDL code are performed. These optimizations can include, for example, in-lining, constant folding, and other optimization techniques known to computer programmers. In a step 516E the internal format is converted into opcodes used for execution with the nanokernel. Thus, an end result of the compilation step is the conversion of the animated scene into a series of opcodes defined for efficient use by the nanokernel. Examples of these opcodes are described in detail below in accordance with one embodiment of the invention.

In a step 528, the opcodes are processed using a linker to form the animated scene in a highly transportable language such as, for example, JAVA®. Specifically, in the embodiment illustrated in FIG. 5 the opcodes are parsed and optimized in a step 528A, the scene definition language primitives are processed into a transportable language in a step 528B and elements from a nanokernel library are processed into the transportable language in a step 528C. The processed opcodes, primitives, and library items are combined to form an executable version of the animated scene in the transportable programming language.

Nanokernel library elements are created in a step 532. These elements can include rendering, logging, change root, traversal state management, additional load management, event loop, and so on. To facilitate the authoring of suitable applications using the authoring tool, scene definition language to authoring tool extensions are performed in a step 536. In one embodiment, scene definition language library items are converted to authoring tool library items in a step 536A. Similarly, scene definition language primitives can be converted into authoring tool primitives in a step 536B. These can be used in step 536C to convert from the internal format to extensions specific to the authoring tool. These items can be used to create GUIs as well as other useful tools.

3. Scene Definition Language

As discussed above, scene definition language can be used to compose atomic actions into a scene, where the atomic actions are defined in the nanokernel or in language primitives. In a preferred embodiment, the language is declarative and functional, meaning that every statement is a side-effect-free declaration and all names refer to constants rather than variables. In the preferred embodiment, the language is also strongly typed, the order in which names are defined is largely irrelevant, and there are no global or scoped variables, although separate name spaces are supported. Additionally, the language can preferably be efficiently translated into the Opcodes discussed herein.

In one embodiment, the syntax for the scene definition language strongly resembles Java. In this embodiment, white space and comments are as defined in Java. The syntax is set forth as follows:

```
whitespace: same as Java
comments: same as Java
package-name: <var-name>|
            <package-name>.<var-name>
var-name: <a-zA-Z__><a-zA-Z0-9__>*
vdl-file: <vdl-function-def>*
vdl-function-def:
     <bound-type> <var-name>({{<vdl-param-def>,}* <vdl-param-def>}?)
     \{
        <vdl-statement>*
        return <value>;
     \}
vdl-param-def: <bound-type> <var-name>
bound-type: <atomic-type>
            <bound-type>[<positive-int>]
unbound-type: <bound-type> |
            <bound-type>[]
vdl-statement: <definition>
definition: <var-def> = <value>;
var-def: <bound-type> <var-name>
value: <int-value> |
       <time-value> |
       <var-name>|
       <var-name>.<accessor> |
       <var-name>[<non-negative-int>] |
       <array-def> |
       <vdl-function-invocation>
atomic-type: int |
             time |
             string |
             drawable |
             color |
             vec2 |
             load |
accessor: x |
          y |
          r |
          g |
          b |
array-def: \{ {{<value>,}* <value>}? \}
vdl-function-invocation: <vdl-proto> |
            <vdp-proto>
vdl-proto:  {<package-name>.}?<var-name>({{<value>,}* <value>}?)
vdp-proto:  {<package-name>.}?<var-name>({{<value>,}* <value>}?);
int-value: <-32768. .32767>
time-value: <-3276. .3276>.<0. .9>? |
            <-3276. .3276>?.<0. .9>
color-value: <0. .255>
positive-int: <1. .32767>
non-negative-int: <0. .32767>
int: <int-value>
time: <time-value>
string: "<unicode-char>*"
drawable: <var-name>
color:   \{ <color-value>, <color-value>, <color-value> \}
vec2:    \{ <int-value>, <int-value>\}
```

In one embodiment, scene definition language includes type values defined as follows:

| | |
|---|---|
| int | defines Integer values from −3276 to 32767. In Java, this corresponds to the short built-in type. |
| time | is a floating-point value in seconds with a maximum resolution of tenths-of-seconds. |
| string | refers to zero or more Unicode characters. |
| drawable | an object that can be rendered. |
| color | preferably rgb values, from 0–255, within curly braces, e.g., {124, 237, 29}. The accessors, .r and .g and .b, are used to access the 1st, 2nd, and 3rd positions, respectively. Internally a color is an array of integers of length 3. |

-continued

| | |
|---|---|
| vec2 | a two dimensional set of integer values, within curly braces, e.g., {468, 60}. The accessors, .x and .y, are used to access the 1st and 2nd positions, respectively. Internally a vec2 is an array of integers of length 2. |
| load | an array of statement names, indicating which load the statement belong to. In one embodiment, alpha is defined as the first load, all other loads merely need a unique name. |

Alternative language embodiments can employ different type fields or utilize alternative syntax.

Any of the types in scene definition language can be defined as an array. Arrays of arrays are acceptable, but arrays with multiple dimensions are preferably rectangular.

Arrays are created by enclosing a list of values in curly braces, e.g., Time[5] joe={1., 2., 3., 4., 5.}; while array elements are accessed using square braces, e.g., return loop(obj, joe[2]);

In a preferred embodiment, no math operations are built-in, although alternative embodiments can provide math operations. Primitives can be written to implement mathematical or other operators as necessary.

A single main function in a scene definition language file with a signature of drawable main () is the initial "root node" of the scene graph. Definitions can be scoped to the function in which they are defined. Unlike the C language, these definitions can create a relationship among the objects. Also, once created, a definition is preferably not modified. In an embodiment where a definition cannot be modified, the following is illegal.

drawable tmp=poly({{0, 0}, {20, 0}, {20, 20}, {0, 20});
  drawable tmp=color(tmp, {255, 255, 0});

Because the language works functionally to build a scene graph, every function preferably returns a value. If a definition is not incorporated into the returned value, it typically does not affect the scene graph and may even be optimized out.

In a preferred embodiment, the package name of a scene definition language file is defined by its location in the class path. The package name is used to create the full path to the file relative to a class path. For example, the following function drawable tmp=fv.twm.utils.poly({{0, 0}, {20, 0}, {20, 20}, {0, 20});

would be defined in one of the class path directories, e.g., ${VOODOO_CLASSPATH}/fv/twm/utils/poly.vdl The following is a simple example of a scene definition language file used to make a simple animated rectangle:

drawable rectangle(int x, int y) {return poly({{0,0}, {0,y}, {x,y}, {x,0}}); }
  drawable main(){
    drawable bg=color(rectangle(468, 60), {0, 0, 0});
    int wa=animate(1, 0., 0, 5., 468);
    int va=animate(1, 0., 0, 2., 60);
    return group({bg, loop(color(rectangle(wa, va), {255, 0, 0}),
    6.)});
  }

The first line in the example declares a new function of type "drawable." This function takes two integer arguments, and returns a "poly" (polygon) based on these arguments. "Poly" in turn takes a single argument that is a variable-length array of points; this call in the present example happens to have four elements in the array. Each element of the argument array is in turn an array of two integers, representing a point. "poly" is a built-in primitive that draws a polygon whose vertices are defined by the points passed as an argument. Hence, "rectangle" is a drawable that draws a rectangle with corners at (0,0) and (x,y), where "x" and "y" are the arguments to "rectangle."

The "main" function is the drawable that is drawn in order to display the animated scene. It first creates a black rectangle to use for the background, and assigns that rectangle to "bg". In the illustrated example, the rectangle is created, then a color is applied. Then an integer "wa" is created; this integer takes on a value that is determined by "animate" each time "main" is called to repaint the scene. In this case, "Wa" will have a value between 0 (at time 0.0 seconds) and 468 (at time 5.0 seconds). Similarly, "va" will have a value between 0 and 60 over the interval of time from 0.0 to 2.0 seconds.

In one embodiment, the initial argument "1" tells "animate" that the animation is smooth. When "main" is called to produce a value to be drawn onto the screen, "animate" looks at the absolute time passed and calculates the new values for "wa" and "va". Finally, "main" composes a drawable to be drawn repeatedly while the animation is displayed. It returns a "group", which is an object that consists of other objects to be drawn in sequence. The first object to be drawn is the "bg" background rectangle (in black). The second object is drawn repeatedly, with the time looping every 6.0 seconds. That is, "loop" evaluates its arguments after setting the current absolute time to be the real absolute time modulo 6.0 seconds; hence, the display of the red rectangle repeats every six seconds. What is drawn inside the loop is a colored rectangle whose size is determined by the "wa" and "va" animated integers and whose color is red ({255, 0, 0}). The nanokernel is responsible for continuously refreshing the display by re-evaluating and re-displaying "main."

4. Internal Format

As described above, the scene definition language can be parsed into an internal format. An example implementation of this internal format is now described. Where the scene definition language can be stored in a file, the internal format is well suited for manipulation in memory. In one embodiment, anything that can be represented in scene definition language can be represented in the internal format and vice versa. Preferably, the internal format is an in-memory object representation of a parsed scene-definition language file. Thus, the internal format can be defined as an API (applications programming interface) for manipulating in-memory representations of scene definition language and is intended for use by the authoring tools. In embodiments where Java is the transportable language utilized, these in memory objects are preferably Java objects, forming a Java API.

One example internal format is now described as follows:

VifContext defines a context in which an internal format structure is being built. It includes a reference to the root node of a constructed scene (i.e., "main"), a reference to a class that can dynamically load more internal formats as references are found (for loading built-ins and libraries and such), a list of the functions defined, descriptions of which functions and variables are in which loads, and so on.

VifFunctionLoader is an interface for classes which can dynamically load internal formats during parsing.

VifLoad defines a class, objects of which represent different dynamic loads, that is, different partitionings of a scene into different classes, to reduce initial load times.

VifType defines a class, objects of which represent types in the internal format program being constructed. Subclasses represent different types.

VifValue defines a class, objects of which represent values in the internal format program being constructed. Subclasses represent different types of values.

VifStatement object represents one internal format assignment statement, such as int I=5;. It can include a type, a variable name, and a value.

VifValueFuncDef object represents a internal format function definition. It subsumes both the declaration and the "return" statement of a scene definition language function.

5. Opcodes for Efficient Animation

Many animations utilized in the production of a web page are being written in a transportable language such as, for example, Java®. Such languages provide application developers with high level constructs for creating and manipulating geometries and 3D geometries, and for constructing structures used to render the created geometries. Application developers use these constructs to describe the "virtual worlds" they create, and provide the language with sufficient information to render the world efficiently.

An advantage of a highly portable language such as Java® is that it typically can be run on a wide range of platforms. This advantage makes these transportable languages ideally suited to applications such as, for example, Internet commerce, where they are likely to be downloaded and expected to run on any of a variety of different platforms.

A common approach to computer animation is to use a scene-graph based programming model. This approach provides a simple and flexible mechanism for representing and rendering scenes. The typical scene graph includes a complete description of the scene or virtual universe to be rendered. This can include geometric data, attribute information and viewing information needed to render the scene from a particular point of view. A typical scene graph is comprised of a plurality of nodes arranged in a tree structure, with invocation relationships defined among the nodes. The developer creates one or more scene graphs as part of the virtual universe.

A node in the scene graph is an object that includes information about the object such as, for example, color, shape, surface material, texture, lighting, reflectivity, transformation, and so on. Typically, each shape (three- or two-dimensional), attribute, camera and light source present in a virtual universe is represented as a node in the scene graph. Each node includes data elements or fields which describe the parameters of the node.

Figure 6:
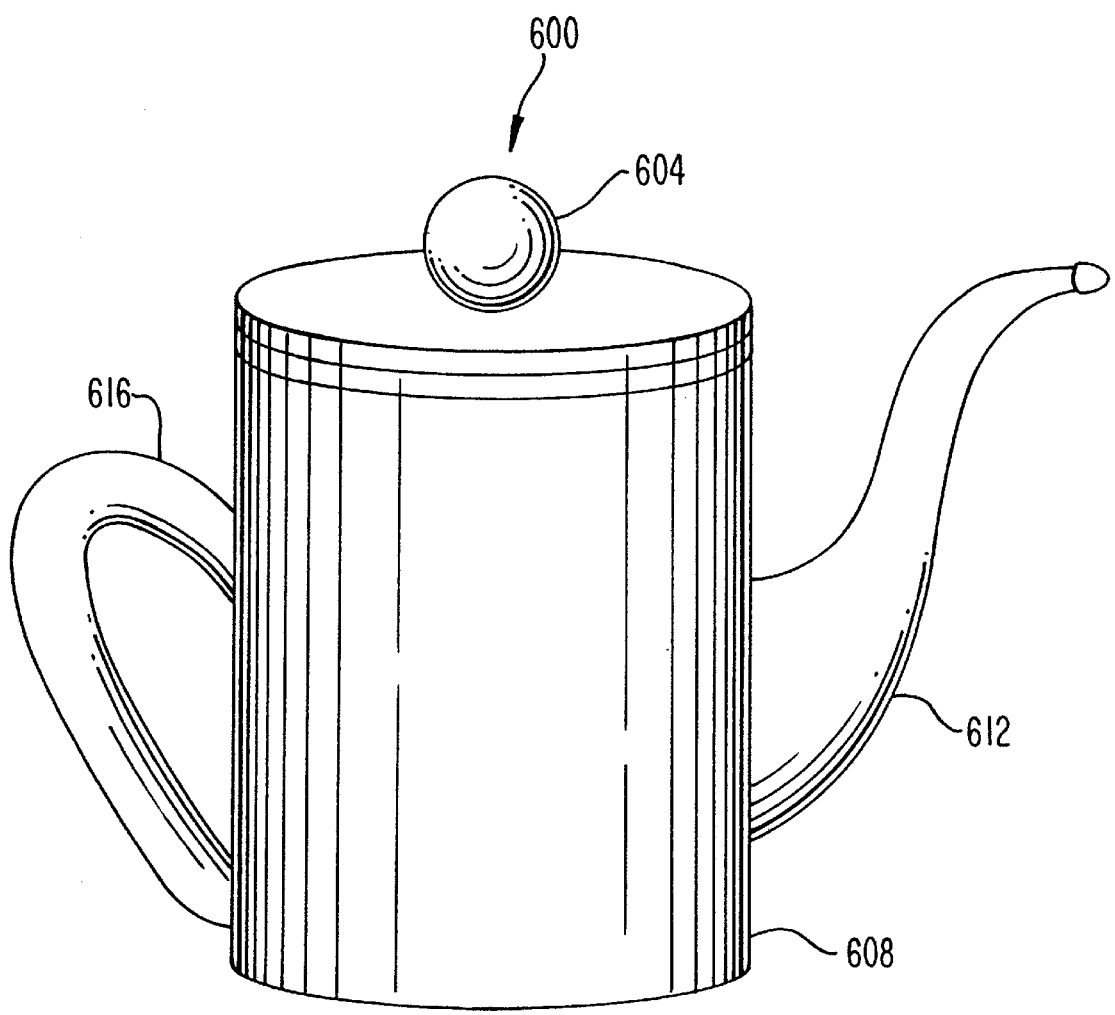
FIG. 6 is a diagram illustrating a simple example of a group of objects used to illustrate a tea pot.
Figure 7:
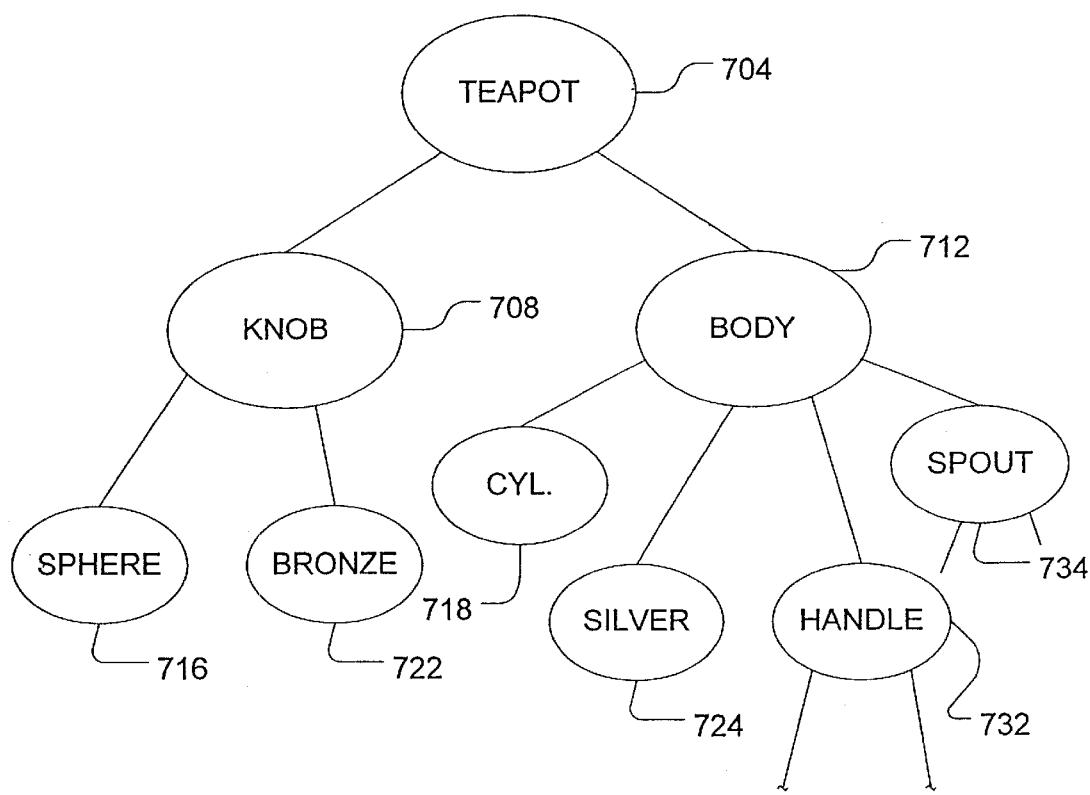
FIG. 7 is a diagram illustrating an example of a scene graph which can be used to describe the objects associated with the tea pot illustrated in FIG. 6.

FIG. 6 is a diagram illustrating a simple example of a group of objects used to draw a scene. FIG. 7 is an example of a scene graph which can be used to describe the objects associated with FIG. 6. Referring now to FIGS. 6 and 7, the scene is a teapot 600. Teapot 600 includes a spherical knob 604, a cylindrical body 608 a spout 612 and a handle 616. In this example, knob 604 will be bronze and body 608 silver. Parent node 704 describes teapot 600. Associated with parent node 704 are two child nodes 708, 712. Node 708 represents knob 604. Parameters associated with node 708 are the shape 716 and the color 722. Similarly, node 712 represents body 608 and has associated parameters for the cylindrical shape 718, and the silver color 724. Additionally, node 712 has child node 732 and child node 734 for handle 616 and spout 612, respectively. Although not illustrated for simplicity, handle node 732 and spout node 734 each have associated parameters for shape and color. Additionally, each node can further include additional parameters or attributes for texture lighting, transformation, and so on.

In conventional graphics systems, the scene-graph based graphics program is executed using a stack-based approach. In the stack based approach, values are maintained in a stack as objects are drawn and animated. As objects are drawn and redrawn, the stack operations are repeated over and over again. For example, consider a simple operation of coloring an object yellow. In a 24-bit RGB system, the color yellow is represented by {255, 255, 0}. These values must first be pushed onto the stack. The program calls a color routine which pops these values off of the stack and assigns them to red, green and blue, makes the color, and pushes the color back onto the stack. This color is then popped off of the stack and assigned to the object. The operation can be illustrated as follows:

push 255 push 255 push 0 call color routine pop color assign color to object while the color routine called can be illustrated as:

pop value off of stack and assign to blue pop value off of stack and assign to green pop value off of stack and assign to red make color push color return These operations are repeated over and over again as the object is redrawn for each frame. Additionally, similar repetitive steps are performed for lighting, shading, texturing, and animating the object. Moreover, these steps are often performed for several objects in the scene. While repetitively computing values and creating numerous objects is not a concern with high-powered systems, this can tend to bog down slower systems, detracting from the user's experience. Thus, the applicability of the animation across a wide range of users with differing computing powers is hindered.

To overcome this detraction with conventional stack based systems, the invention utilizes a different approach which speeds the operations of rendering objects and minimizes the requirement for performing repetitive operations. Generally speaking, the invention defines a series of operation codes (referred to as "opcodes") and associated parameters or arguments to define rendering operations. Preferably, these opcodes are highly-condensed instructions which are interpreted by a kernel downloaded or otherwise resident on the user's machine.

In one embodiment, the opcodes are represented as an array of array of short integers, where each sub array can be of different length. Each sub array represents a single opcode with its arguments. One opcode with its attendant arguments is called a node and is indexed by the first index of the array of array of shorts. Each individual integer within each array of shorts can be an integer parameter, a time value, an index of another node, an element of the color, and so on.

In this embodiment, each opcode and its associated parameters is an array of integers. A group of opcodes is an array of array of integers. To illustrate, consider a simple example. Consider the opcodes group 2,3 rect 20,20 rect 5,20

In this example, the opcodes group and rect can be identified using integers. For example, the opcodes group and rect can be identified by the integers 0 and 1, respectively. This yields an array of vectors:

0,2,3
1,20,20
1,5,20

Figure 8:
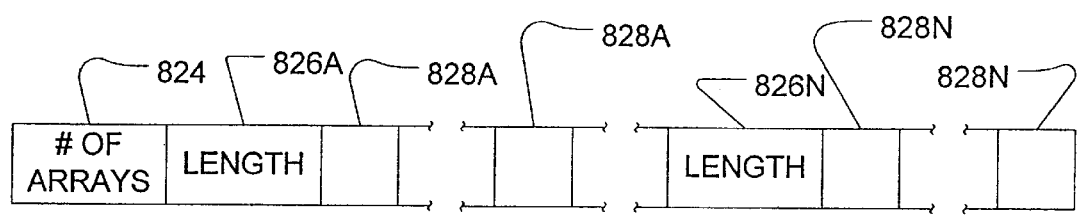
FIG. 8 is a diagram illustrating an embodiment in which opcodes can be described by an array of integers.

This array of vectors can be flattened into a single array of integers. One embodiment of this single array of integers is illustrated in FIG. 8A. According to this embodiment, this single array has a first integer 824 representing the total number of arrays of integers in the original array of array of integers. The next field 826A represents the number of parameters in the first array and is followed by the integer values for those parameters 828A. In the example illustrated above, for the first array of integers, parameters 828A would be 0,2,3.

For subsequent arrays of integers, the same format is followed to the Nth array of integers. In the example illustrated above, the integers in the final array 1,20,20 would occupy locations 828N. To further illustrated this flattened single array of integers, the example array of vectors would be represented as:

{3,3,0,2,3,3,1,20,20,3,1,5,20}

To further gain efficiencies, this flattened single array of integers can be converted to a text file. This can be done, for example, using a simple mapping where each integer corresponds to a different number in a text file. For example, in one embodiment, the integers are mapped to a corresponding ASCII character. As another example, consider a simple mapping where the integers 0–25 correspond to the letters in the alphabet a–z. Following this second example, the example array would convert to:

"ddacddbuudbfu"

In one embodiment where Java is utilized as the extensible language, this string of alphanumerics can be coded using UTF-8. Because UTF-8 inherently performs a variable length compression, this step provides the added benefit of compressing the string. Additionally, the alphanumeric string itself can be compressed prior to coding using UTF-8.

In another embodiment, the opcodes are represented as an array of parameters, which can be of different lengths. This array includes a length count followed by that number of parameters.

Preferably, the array of length-data shorts are stored in a class file as a string. In one embodiment, the invention takes advantage of compression techniques which compress the string. In particular, in an embodiment where the application language is Java based UTF-8 compression is used. Java uses Unicode, and characters are typically two bytes long. UTF-8 compresses many of the Java two-byte characters to one byte.

Because ASCII NULL is represented as two bytes in Java's version of UTF-8, one additional technique is applied to further compress the string. In this technique, all the shorts are incremented by one before being stored into the string. This has the beneficial side-effect of slightly obscuring any text that might be in the string from casual prying.

In one embodiment, memory or a data cache is associated with at least some of the opcodes. In this embodiment, data relating to the execution of the opcodes is cached so that it can be re-used in subsequent performance of the same operation. To better understand the cache and some of its advantages, consider the above stack-based approach example of coloring an object yellow. As you will recall, that approach required the object to be colored and re-colored each time the object is drawn for each frame. In contrast, using the opcodes according to the present invention, the color values can be stored in the cache and simply recalled when the object is drawn in the next frame. In one embodiment, the cache is implemented using a hash table. An example embodiment of caching is described in more detail below.

In one embodiment of the invention, a plurality of opcodes that support function calls are implemented. Three of these opcodes are USEFUNC, COPYPARAM, and COPYFUNC. USEFUNC specifies a list of arguments to a function, along with a designation of which node number implements that function. COPYPARAM copies parameters form a USEFUNC node into the proper places inside the nodes that implement the functions. In essence, a USEFUNC opcode provides the argument list and an indication of the function to call, and a sequence of one or more COPYPARAM opcodes are executed by the function called. The COPYPARAM opcodes copy entries from the USEFUNC node into the proper places into function's scene graph nodes. This has the effect of modifying the function code with each call, writing the arguments into the place where they are used. As a result of this architecture, each call to a function is relatively small. In fact, the software can get away with only passing the minimum amount of information needed while the function of actually performing an operation using the arguments only need be encoded once at the place where the function is implemented. In one embodiment, this minimum set of information can include the fact that it is a call, what is being called, and the values of the arguments.

The COPYFUNC opcode is used for functions that return values, such as integer values. COPYFUNC is similar to COPYPARAM except that it invokes a node, takes the result of that invocation and installs it into the current function farther down in the routine.

Figure 9:
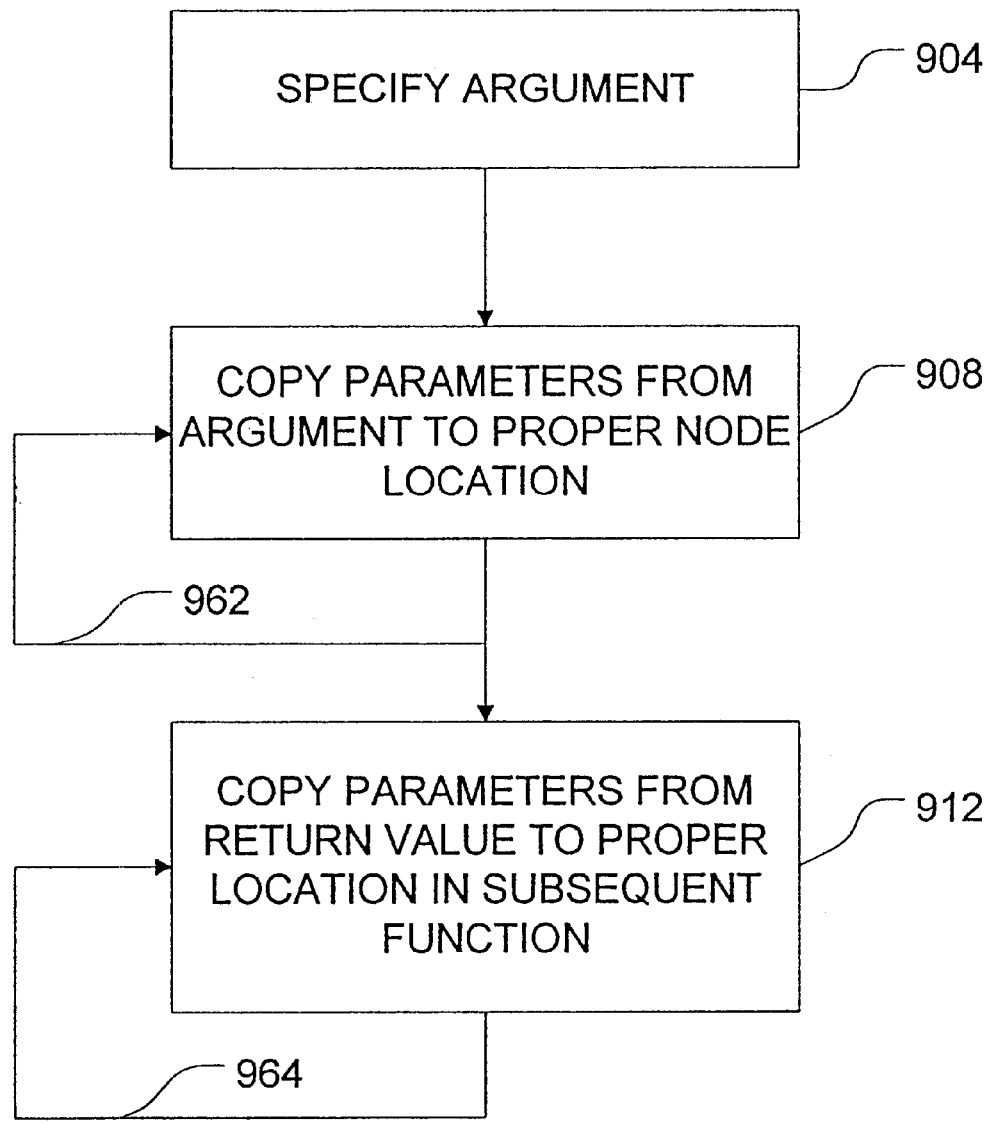
FIG. 9 is an operational flow diagram illustrating a process by which a routine can implement opcodes according to one embodiment of the invention.

FIG. 9 is a diagram illustrating a process by which a routine can implement the above-described opcodes according to one example implementation of the invention. Referring now to FIG. 9, in a step 904, USEFUNC specifies one or more arguments to be used by a function. USEFUNC also specifies a designation of a node which will implement that function. In a step 908, a COPYPARAM operation copies parameters from the USEFUNC argument into a proper location inside the node designated to implement the function. As a result of this step, the function code is modified by writing the arguments into the place where they are used. If there are additional COPYPARAM operations to be performed, each subsequent COPYPARAM copies parameters from the USEFUNC argument into a proper location inside the node designated to implement the function. This is illustrated by flowline 962.

In a step 912, COPYFUNC opcode copies a return value from the USEFUNC node into a proper location in a subsequent function in the routine. In one embodiment, COPYFUNC calls a function and retrieves a return value from the function. The retrieved return value or values are inserted into another function. If there are additional COPYFUNC operations to be performed, each subsequent COPYFUNC copies a return value from a function into a proper location inside another function node as illustrated by flow line 964.

In an alternative embodiment, a COPYARRAY opcode is additionally provided. The COPYARRAY opcode allows an array of arguments to be copied into the function in a single step. Compared with COPYPARAM which copies a single argument, the COPYARRAY opcode provides increased efficiencies.

To further illustrate the opcodes, consider a simple example. In this example, assume the following code:

```
builtin int anim;
builtin drawable translate (drawable, int,
int);
drawable main() {
    int I = anim();
    int j = anim()
    return translate(obj, I, j);
}
```

In this example, ANIM is a function that returns an integer. In one example embodiment, the above code effectively translates into three main instructions. In this example, the first instruction uses COPYFUNC to say "call anim and stuff the return value into the middle of the node representing the call to the translate function as the second argument." The second instruction uses COPYFUNC to say "call anim and stuff the return value into the middle of the node representing the call to the translate function as the third argument." The final opcode would be a USEFUNC to call the translate function with the three arguments in the USEFUNC node.

The compilation of scene definition language into opcodes is now described using a simple example. In this example, the animated scene generated is a banner ad for display on a user's computer screen.

```
drawable main() {
    drawable bg = color(rectangle(468, 60),
{0, 0, 0});
    int x = animate(1, 0., 0, 5., 468);
    int y = animate(1, 0., 0, 2., 60);
    return group ({bg, loop(color(rectangle(x,
y), {255, 0, 0}), 6.)});
drawable rectangle(int x, int y) {
    return poly({{0,0}, {x,0}, {x,y}, {0,y}});
}
```

In this example, main creates a colored background rectangle the size of the banner ad (468 by 60). It then sets up two animated variables, x and y. It then creates a rectangle in red which repeatedly loops those animated integers every six seconds, overlaying the red rectangle on the black background. This translates into the following set of opcodes, presented here in a fairly readable format.

```
{},
\* 1 *\ {GROUP, 2},
\* 2 *\ {2, 3, 11},
\* 3 *\ {COLOR, 4, 0, 0, 0},
\* 4 *\ {USEFUNC, 5, 468, 60},
\* 5 *\ {COPYPARAM, 6, 2, 10, 3},
\* 6 *\ {COPYPARAM, 7, 2, 10, 5},
\* 7 *\ {COPYPARAM, 8, 3, 10, 6},
\* 8 *\ {COPYPARAM, 9, 3, 10, 8},
\* 9 *\ {POLY, 10},
\* 10 *\ {4, 0, 0, 0, 0, 0, 0, 0, 0},
\* 11 *\ {LOOP, 12, 60},
\* 12 *\ {COLOR, 15, 255, 0, 0},
\* 13 *\ {USEFUNC, 5, 0, 0},
\* 14 *\ {ANIMATE, 1, 0, 0, 50, 468},
\* 15 *\ {COPYFUNC, 17, 14, 13, 2},
\* 16 *\ {ANIMATE, 1, 0, 0, 20, 60},
\* 17 *\ {COPYFUNC, 13, 16, 13, 3}
```

In the compilation, "main" translates to the first node, a GROUP command grouping the list of op-codes in node 2. Nodes 2 and 10 represent lists in the original scene definition language code. Node 2 is a list two elements long (its length being represented by the first integer), referencing node 3 and node 11.

Figure 10A:
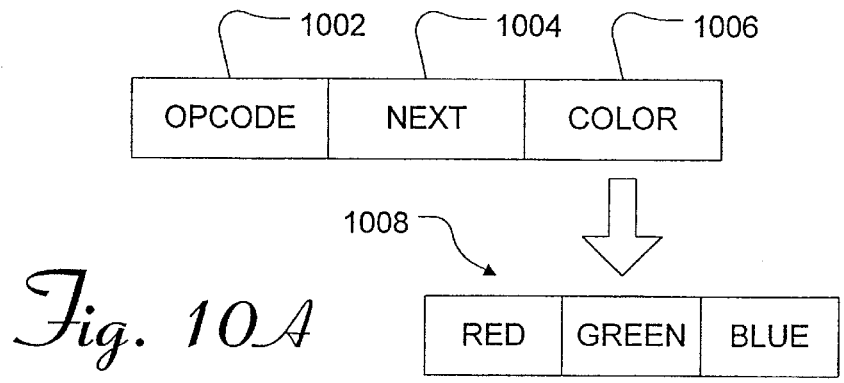
FIG. 10A is a diagram illustrating an example format for a color node according to one embodiment of the invention.

Node 3 is a color node. Color node strings can include an opcode, a "next" node (node to which the color is to be applied), and the color values. FIG. 10A is a diagram illustrating an example format for a color node according to one embodiment of the invention. In this example, the color node includes an opcode 1002, a next node 1004 and a color value 1006. In this case, opcode 1002 is color. Next node is the node to be executed after the present node is completed and color value 1006 represents the color. In implementations using RGB color, three RGB values 1008 are used to represent the color. In the example code, Node 3 is a color node which sets the color to black (0, 0, 0), then interprets the next node, in this case, node 4.

Figure 10B:
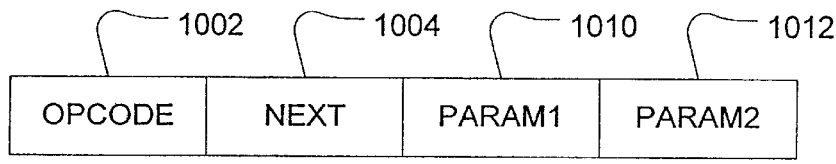
FIG. 10B is a diagram illustrating an example format for a USEFUNC node according to one embodiment of the invention.

Node 4 is a USEFUNC node. FIG. 10B is a diagram illustrating an example format for a USEFUNC node according to one embodiment of the invention. In this example, the node includes an opcode 1002 and a next node 1004, similar to the color node. USEFUNC nodes also include two parameter values 1010, 1012. In the example code, Node 4 says to save the argument list of (486, 60), where these are the two parameters, and then execute node 5.

Figure 10C:
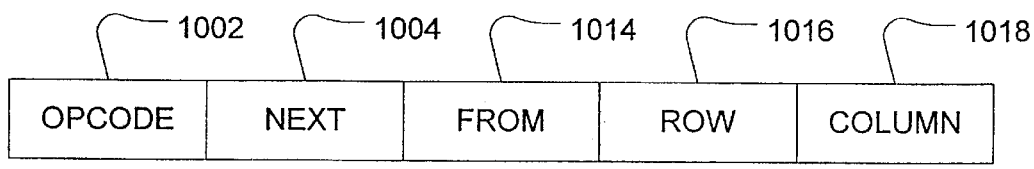
FIG. 10C is a diagram illustrating an example format for a COPYPARAM node according to one embodiment of the invention.

Node 5 is a COPYPARAM node. FIG. 10C is a diagram illustrating an example format for a COPYPARAM node according to one embodiment of the invention. In this example, the node includes an opcode 1002 and a next node 1004, similar to the color node. COPYPARAM nodes also include a from index 1014 as well as a row 1016 and column 1018 designation. Row and column values 1016, 1018 indicate a location where the extracted values are to be placed. COPYPARAM nodes take four arguments: the next node to execute, the argument to copy, a node number and an offset within the node.

Hence, nodes 5, 6, 7, and 8 get executed in turn, copying 468 into node 10 at offset 3, and node 10 at offset 5, then copying 60 into node 10 offset 6 and node 10 offset 8. It should be noted that these are the positions of the X and Y arguments in the "poly" call inside "rectangle," counting the length count for the list as element zero of the list.

The final COPYPARAM node executes node 9, which is a POLY command to draw the polygon described in node 10. Once this is finished, the GROUP command back in node 1 interprets node 11, a LOOP operation. The LOOP operation interprets node 12 repeatedly, looping time back on itself every 60 deciseconds. Node 12 sets the color to red (255, 0, 0) and then skips to node 15.

Figure 10D:
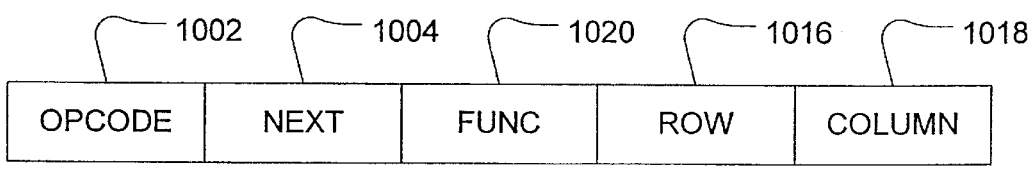
FIG. 10D is a diagram illustrating an example format for a COPYFUNC node according to one embodiment of the invention.

Node 15 is a COPYFUNC node. FIG. 10D is a diagram illustrating an example format for a COPYFUNC node according to one embodiment of the invention. In this example, the node includes an opcode 1002 and a next node 1004, similar to the color node. COPYFUNC nodes also include a from designation 1020 as well as a row 1016 and column 1018 designation. From designation 1020 indicates a node from which the value is to be extracted. Row and column values 1016, 1018 indicate a location where the extracted values are to be placed. COPYFUNC nodes take four arguments: the next node to execute, the function to execute, a node number and an offset within the node.

In the example code, Node 15 says to interpret the integer function in node 14, store the result in node 13 offset 2, and then interpret node 17. Node 17 says to interpret the integer function in node 16, store the result in node 13 offset 3, and then go to node 13. Nodes 14 and 16 are straight-forward calls to the ANIMATE built-in function.

Node 13 specifies the argument list and then interpret the node at 5. Node 5 is once again the rectangle function. Here, we can see that the COPYPARAM nodes are stored once for each function declaration, not once for each function invocation. Once the initial GROUP operation is interpreted, the nanokernel waits an instant and then starts over again. Cached information will be retained, but items like the result of the LOOP and ANIMATE procedures will be recalculated as appropriate.

Figure 11:
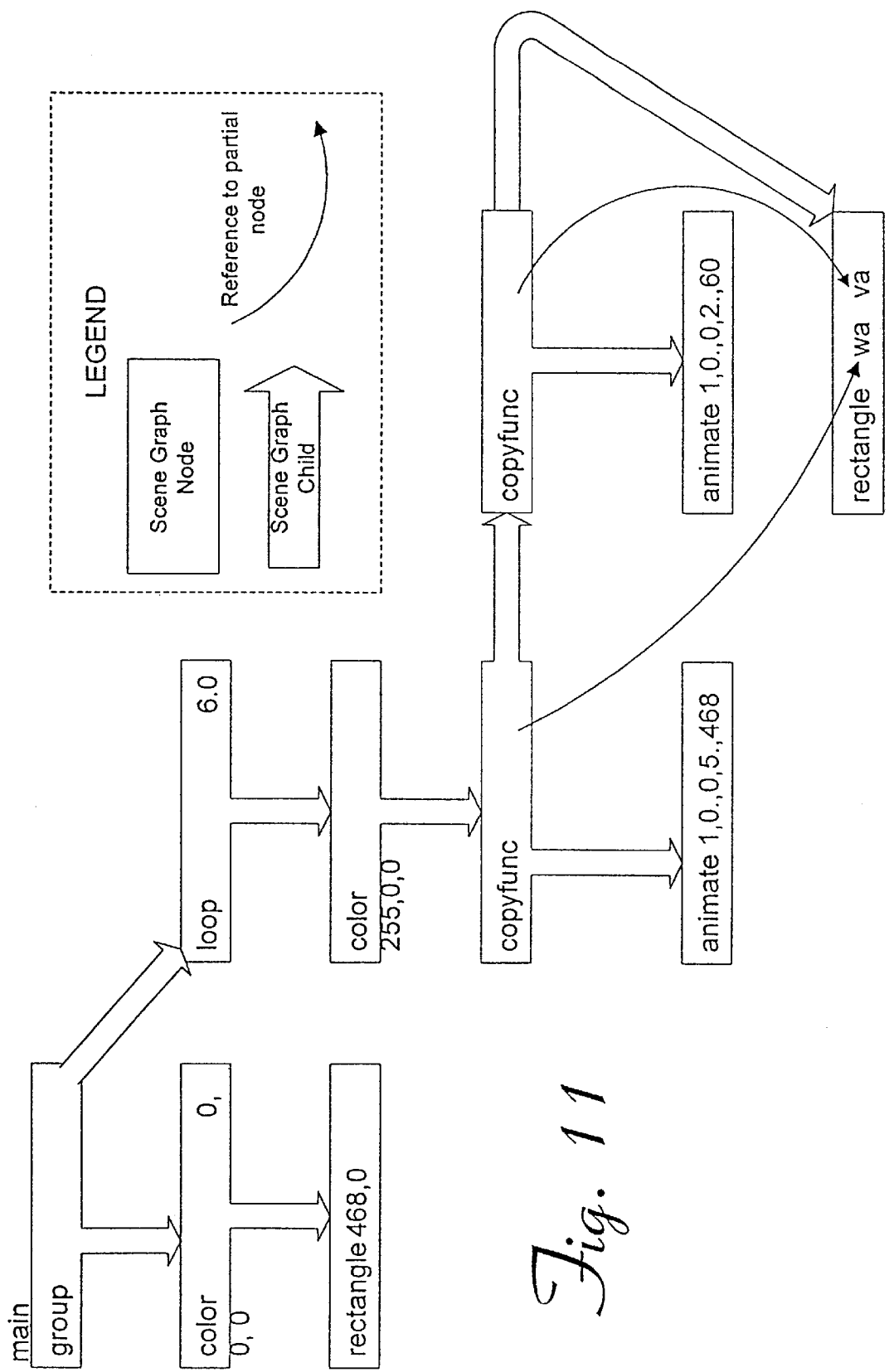
FIG. 11 is a diagram illustrating an example scene graph.

The simple example of a scene definition language file used to make a simple animated rectangle as disclosed above, can be represented in terms of a scene graph. In this example embodiment, the "main" function translates into a scene graph such as that illustrated in FIG. 11. Note that integer functions can be implemented by COPYFUNC, which calls the function and then copies the result into the call where it belongs. In one embodiment, this scene diagram treats "rectangle" as a built-in function; otherwise, it would have its own graph nodes, including nodes with USEFUNC and COPYPARAM.

6. Primitives

Definition language primitives are used to specify drawing primitives which the scene definition language can then compose into an interactive scene. The language is used as a wrapper around bodies of functions that are written in a transportable language, such as, for example, Java. In one embodiment, there are two possible modes of compilation for definition language primitives files, depending on how the definition language primitive file is to be used. The first mode is for authoring tools, while the second mode is for actually creating an animated scene.

These modes are now described in more detail. In this description, the example transportable language is assumed to be Java. The example is described in terms of Java for ease of description. After reading this description, it will become apparent to one of ordinary skill in the art how to implement the primitives in conjunction with an alternative language. In the first mode, the header information is copied into a separately-parsable file, and each definition language primitive op-code is stored as a separate Java class. This allows a Java-enabled authoring tool to load hand-coded special effects and display them as the animated scene is being authored. In one embodiment, the header information is stored in the Java itself as a structure returned from one of the methods implemented by the class. This allows an authoring tool to dynamically load a named class, query it about the arguments it accepts and the type it returns, and then call the appropriate functions to display previews during authoring.

In the second mode, the definition language primitive compiler assigns an opcode to each definition language primitive, generates an internal format data structure defining the arguments and return type, and in-lines the bodies of the operation into a switch statement in the body of the scene's nanokernel code. In some embodiments, it can also operate on the code inside the body to perform various transformations, wrapping the individual "methods" of a definition language primitive "class" in if statements to distinguish various calls, changing color.r to color[0] (since colors are represented as int[3] internally), and so on.

This second technique allows the use of a single function in a single class to encode all the operations needed for a particular scene, which in turn reduces the amount of data transferred between the server and the browser and reduces the number of connection handshake sequences. Essentially, by in-lining the opcodes and definition language primitive code into a single function of a single class, an animated scene becomes just as efficient to transmit as an animated GIF; it requires one connection and about the same number of bytes. Since each function declaration in Java takes about a hundred bytes of overhead, all the definition language primitive primitives are pushed into one function in the high-efficiency mode.

7. The Nanokernel

Conventional multimedia systems use what is referred to as a player/media architecture for loading animated scenes to a remote location. With this conventional architecture, the user first downloads a player which contains all of the necessary built-in functions which could be used by the media. The player then subsequently retrieves one or more downloads of the media and plays the media. One of the reasons for instituting this conventional architecture was to break down the load into manageable pieces which could each be downloaded more quickly than could the player with the entire media sequence.

This conventional architecture, however, is inefficient for at least two reasons. First, the player is downloaded all at once and typically includes all functions which could be utilized by the media. Where that functionality is not needed by the particular media being downloaded, the bandwidth consumed by downloading that functionality is wasted. Second, according to this conventional architecture a minimum of two loads is needed: one for the player and a second for the media to be played.

The inventors have overcome these inefficiencies through a variety of techniques. According to one embodiment of the invention, an extensible nanokernel (i.e., a player) along with procedures and data used to initially animate the scene are included in the first load. Preferably, the nanokernel allows subsequent loads to define additional functionality specific to that load as an extension to the nanokernel. This approach overcomes the two shortcomings of the conventional architecture by providing the functionality and data necessary to provide an initial animated scene in the first load and by limiting the functionality to only that needed for the initial animation.

Figure 12:
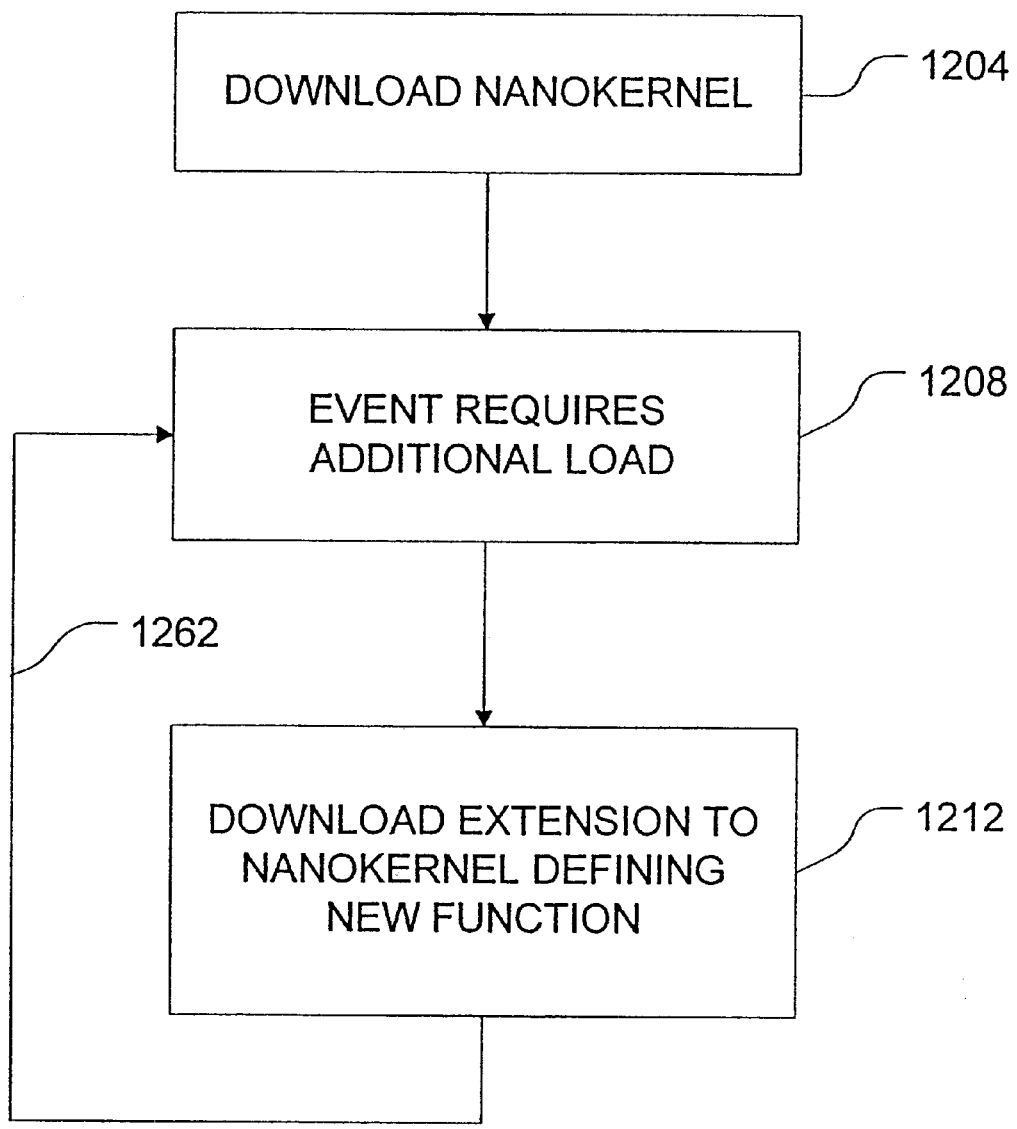
FIG. 12 is an operational flow diagram illustrating a process by which downloads can be structured according to one embodiment of the invention.

FIG. 12 is an operational flow diagram illustrating a process by which the downloads can be structured according to one embodiment of the invention. As described above, in a step 1204 a nanokernel and associated data are delivered to the user to render the animated scene. The nanokernel preferably contains only those functions needed to render the animation provided with the first load. By limiting the content of the nanokernel in this manner, the bandwidth and time required to download and initialize the nanokernel is minimized, while the user is assured of receiving the functionality necessary to render the initial animated scene. Along with the nanokernel, opcodes and any data initially used to animate the first scene are also preferably provided. As a result, only a single download is required to render the initial animated scene.

In a step 1208 an event occurs which causes a second load to be initiated. As discussed above, the event may be user interaction with the scene by mousing over the scene, clicking a provided button, some other user interaction, the passage of a timeout interval, or some other alternative event. The second download can, for example, be an additional animated scene which may require additional functionality not included in the originally downloaded nanokernel. Where this is the case, in a step 1212 an extension to the nanokernel which includes the necessary functionality to be downloaded is included in one package. Where additional animated scene requires opcodes or other data which were not needed and therefore not provided in the original download these too are loaded in this subsequent load.

Should additional events occur requiring additional loads, the process continues as illustrated by flowline 1262. Where functionality, opcodes or data needed for a subsequent load have already been submitted in a previous load, these duplicate items do not need to be re-sent to the user in the subsequent load. A manner by which duplication is managed, minimized or avoided is described below according to one embodiment of the invention.

8. Incremental Loading

To provide incremental loading, conventional programming languages (for example, JAVA®) define a hierarchical object structure which dictates the order or necessity of downloading an object with a given load. For example, where a form is to be provided to a user to fill out, the loading of the objects used to implement the form is based on prototypes used to define the behavior of those objects. For instance, if the form contains one or more clickable buttons, a button prototype is typically loaded to instantiate button objects. Because these conventional hierarchies use class inheritance, downloading of a prototype is often a recursive operation in which each of the superior prototypes in the object hierarchy are downloaded first. Furthermore, conventional loading techniques transmit a single prototype in each network transaction, which introduces latencies into the system.

According to one embodiment of the invention, the scene graph is split into multiple sub-graphs to achieve incremental loading. For each such division, one or more pointer nodes are placed in other subgraphs. These pointer nodes may contain an opcode causing the corresponding subgraph to be loaded.

As disclosed above, according to one embodiment of the invention, the animated sequence is divided into a plurality of portions and each portion is loaded individually. These portions are referred to as loads. Effective designation of the loads of the animated sequence will lead to a more effective utilization of the available resources. For example, as discussed above, it is useful to define the minimal set of functionality and data required in each load. In this manner, only the data and functionality necessary at each interval needs to be downloaded to and executed by the user's computer.

According to one embodiment of the invention, the loads are defined by creating subgraphs from the original scene graph. More specifically, once the original scene graph is created, the original scene graph can be split into a plurality of scene graphs which are logical divisions of the original scene graph. The subgraphs can be assigned load numbers to indicate to which load each subgraph belongs.

Figure 13:
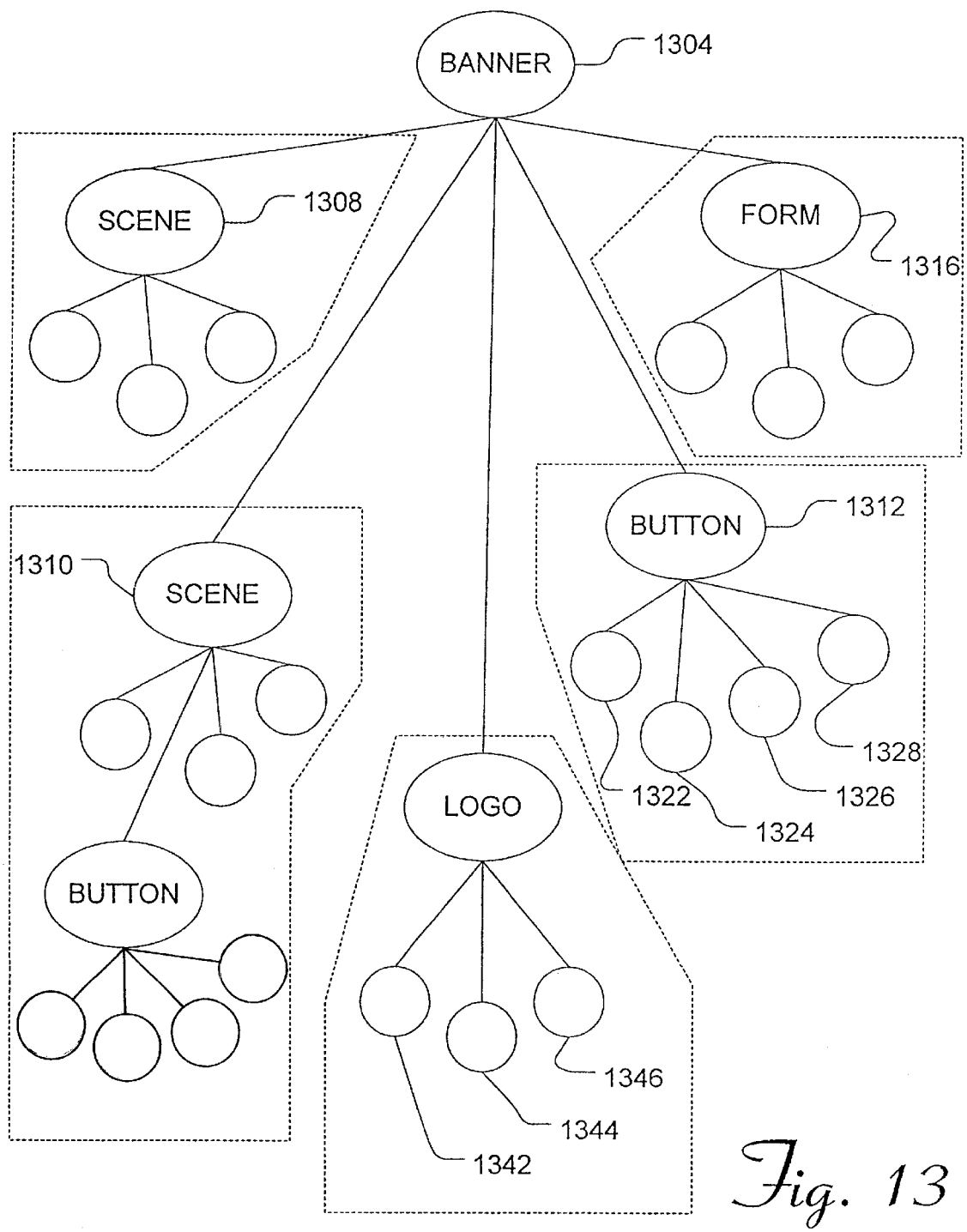
FIG. 13 is a diagram illustrating an example scene graft and an example of how that example scene graph can be split into several sub-graphs according to one embodiment of the invention.

FIG. 13 is a diagram illustrating an example scene graph and an example of how that scene graph can be split into several subgraphs in accordance with one embodiment of the invention. For the example illustrated in FIG. 13, the scene graph to be downloaded and played on the user's computer is a simple animation such as a banner ad. The banner ad includes a bounded animated scene along with a company logo. Subsequent downloads of the scene include buttons which can be pressed by the user, enhanced scene animations, and a form which can be filled out by the user for ordering products. Thus, one implementation of a scene graph for this example is depicted in FIG. 13. The scene graph is for a banner which is depicted by root node 1304. Subordinate nodes include a node for the initial scene 1308, the enhanced scene 1310, the company logo 1312, one or more buttons 1314, and a form 1316. Each of these subordinate nodes includes one or more of its own subordinate nodes to define the properties and features of the object represented. For example, the button node 1314 might include a button function 1322, a button shape 1324, button color 1326, and so on. Similarly, the logo node 1312 may include subordinate nodes to indicate the location of the logo on the banner 1342, a background color for the logo 1344, whether the logo is animated, and so on.

In the example illustrated in FIG. 13, the scene graph is split into five subgraphs as illustrated by dashed enclosures 1372, 1374, 1376, 1378, and 1380. Each subgraph has a root node which was the immediate subordinate of the root 1304 of the original scene graph. Subgraphs can be assigned load numbers for internal purposes such as referencing.

For each subgraph created, one or more nodes (not illustrated) are added to the other subgraphs. These additional nodes contain at least an opcode which causes the corresponding subgraph to be loaded. Through the use of these additional nodes, traversal of the tree can be accomplished even though it is broken up into a plurality of subgraphs.

Because scene graphs are not trees, it is possible for a subordinate node within the graph to be delegated and contained within two or more subgraphs. Where this is the case, it may be necessary to make a determination as to which subgraph is loaded first, and the duplication can be eliminated accordingly.

Figure 14A:
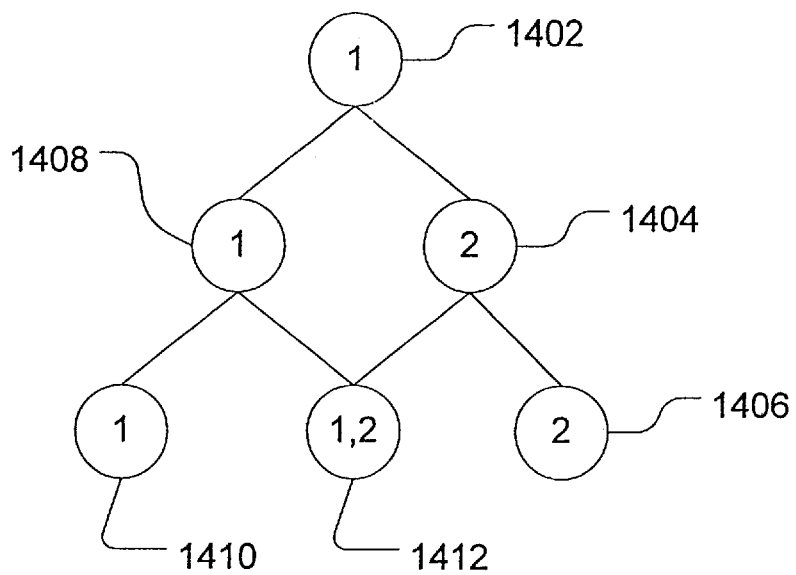
FIG. 14 is a diagram illustrating a plurality of elements associated with a plurality of loads according to three examples as provided by FIGS. 14A, 14B, and 14C.
Figure 14C:
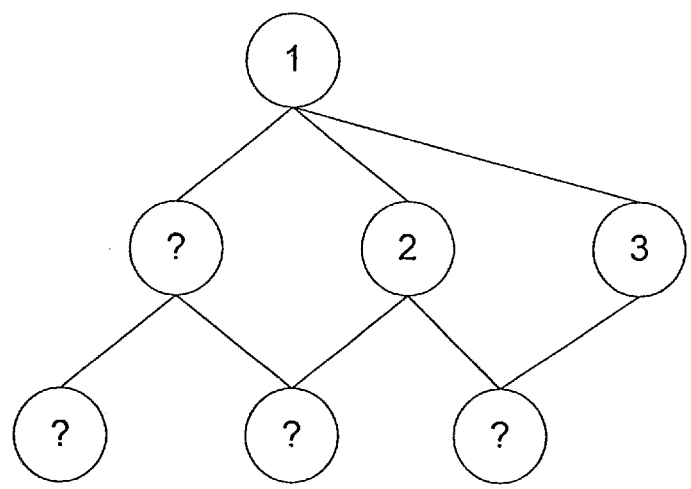
Figure 14B:
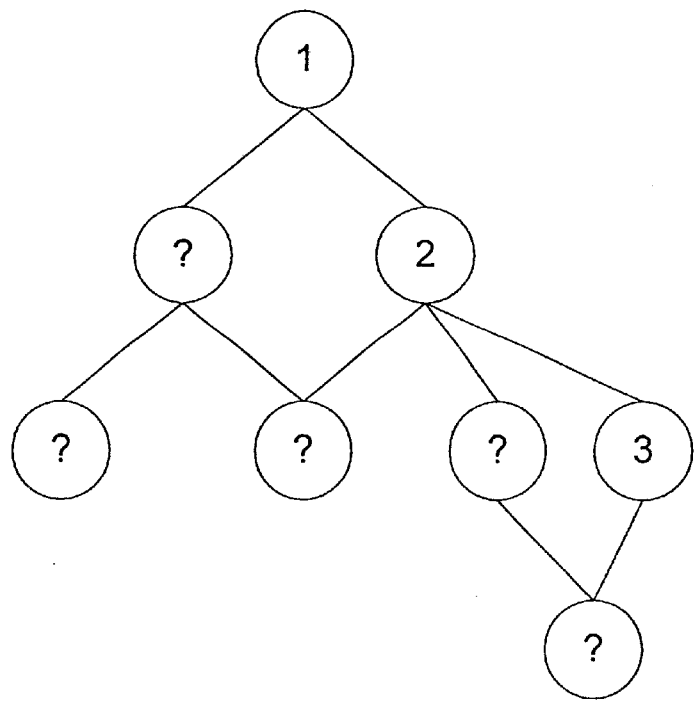

There are a number of techniques which can be utilized for determining the load to which a subgraph is assigned. In some cases, the determination can be accomplished in an automated fashion following a simple routine. To better illustrate this, first consider a simple example. FIG. 14 is a diagram illustrating a plurality of elements which are associated with a plurality of loads. More specifically, the example illustrated in FIG. 14 includes six elements, 1402, 1404, 1406, 1408, 1410, and 1412. Assume for the purpose of providing an illustrative example, that the example illustrated in FIG. 14 draws a simple rectangle to which text, a logo, and a button can be added such as that illustrated in FIG. 15. Following this example, in the first load the rectangle is drawn, it is colored, and the text 1508 is added. Additionally, the logo is added in the first load. At the second load, button 1560 is added and the button is colored a desired color and text is added to the button. Referring to the nodes illustrated on FIG. 14, 1402 loads the functionality required to draw the rectangle. Node 1408 provides the functionality necessary to color the rectangle, and node 1410 adds the text 1508 that goes within rectangle 1504. Finally, node 1412 adds logo 1540. Because each of these nodes is included in the first load, they are designated with the numeral one in FIG. 14. For the second load, button 1540 is added at node 1404 and text is added to the button at node 1406. Additionally, the logo is included with the second load as indicated by node 1412. For clarity, the nodes associated with load two are labeled with the numeral 2. Thus, by looking at the scene graph illustrated in FIG. 14, it is easy to determine which nodes are associated with which loads. However, following this simplistic approach may lead to inefficiencies during the actual implementation of the animation sequence. For example, in the process just described, each node was positively assigned to a particular load. Such assignments require input by the developer of the animation sequence. Also, you will note that node 1412 provides functionality which is utilized in both loads 1 and load 2. If too simplistic an approach is taken, this functionality may be downloaded twice, which is a duplication of effort and a waste of resources. Thus, in accordance with one embodiment of the invention, a minimal set of nodes are actually designated with a particular load, and the remainder are determined during compilation.

Figure 16:
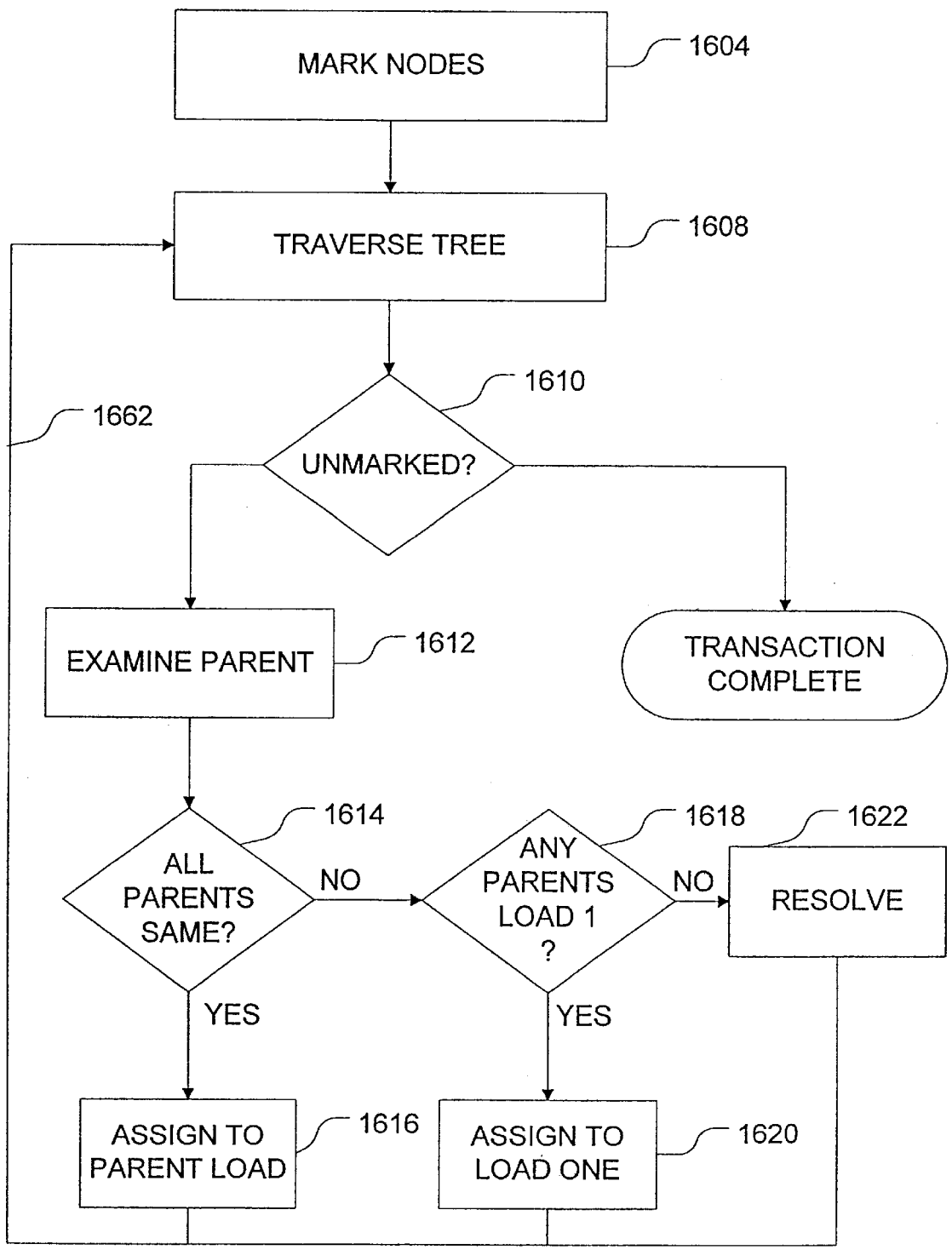
FIG. 16 is an operational flow diagram illustrating an example process by which unmarked nodes can be designated with a load number in accordance with one embodiment of the invention.

FIG. 16 is an operational flow diagram illustrating an example process by which unmarked nodes can be designated with a load number in accordance with one embodiment of the invention. In a step, 1604, the developer examines the tree and designates what the developer believes to be a minimum set of nodes which need to be defined to allow the remainder of the nodes to be determined unambiguously. In a step 1608, the compiler traverses the tree looking for undesignated nodes. When an unmarked node is located, its parent node is examined to determine the load number for that parent. This is illustrated by steps 1610 and 1612. If there is only one parent to the node in question, that node is assigned the load number of the parent and the operation continues to search for additional unassigned nodes. This is illustrated at steps 1614 and 1616 and by load line 1662.

If, however, the unmarked node has more than one parent, there may be an ambiguity which needs to be resolved. If one of the plurality of parents of the unmarked node is assigned to load 1, the unmarked node is also assigned to load 1. This is illustrated by step 1617 and 1620. This designation is performed in one embodiment of the invention because it is necessary that all of the minimum requirements for the first load be met in the first load. As such, where functionality of a node may be utilized in both a first and second load, for example, that functionality must also be provided with the first load in this embodiment to ensure that the first load has the required functionality. Therefore, this apparently ambiguous case can be easily resolved by assigning that node to load 1.

Where there is more than one parent, at least some of the parents are associated with different loads, and none of the parents are associated with load 1, the ambiguity must be resolved using other means. This is illustrated by steps 1618 and 1622. Examples of the other means by which ambiguities can be resolved are described in further detail below. As illustrated in FIG. 16, by flow line 1662 and step 1610, traversal of the tree continues until there are no more unmarked nodes which need to be resolved.

Figure 15:
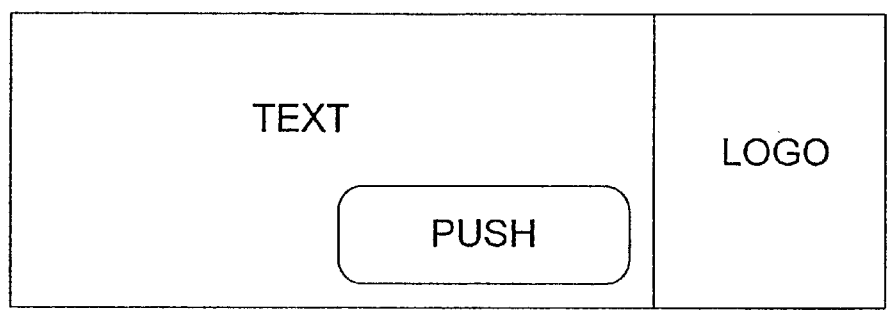
FIG. 15 is a diagram illustrating an example scene which can be drawn in a plurality of loads.

The example process described with reference to FIG. 16 can now be further described with reference to the simple example illustrated in FIGS. 14 and 15. In this example, assume that in step 1604 the developer marked the minimum set of nodes 1402 and 1404 as belonging to load 1 and load 2 respectively, and left the remaining nodes 1408, 1410, 1412 and 1406 unmarked.

Traversal of this tree in step 1608 reveals that node 1408 is unmarked. When the parent is examined in step 1612, it is determined that there is only one parent and that that parent is assigned to load 1. As such, node 1408 is assigned to load 1. Traversal of the tree continues and node 1410 is discovered. As was the case with node 1408, node 1410 has one parent which happens to be node 1408, this node is assigned to load 1.

Further traversal reveals that node 1406 is also unmarked. Examination of its parent indicates that there is only one parent 1404 and that that parent is assigned to load 2. Therefore, in accordance with the embodiment disclosed in FIG. 16, node 1406 is assigned to load 2. Finally, traversal of the tree reveals that node 1412 is also unmarked. However, when the parent is examined in step 1612 it is revealed that node 1412 has two parents. These are nodes 1408 and 1404. This means that for the functionality provided by node 1412 (addition of the logo as according to the example described above) is required for both loads 1 and load 2. However, because one of the parents, node 1408, is associated with load 1, node 1412 is assigned to load 1 in accordance with step 1620.

At this point, traversal of the tree reveals that there are no more unmarked nodes and therefore the process is completed. A slightly different scenario arises where node 1402 is not associated with the first load. For example, consider the scenario where node 1402 is assigned to load 2 and node 1404 is assigned to load 3. In this scenario, node 1408 inherits the load characteristics of its parents and is assigned to load 3. Thus, in this new example, the addition of the logo which is no longer part of load 1, is now required for both loads 2 and load 3. Because loads 2 and load 3 can be downloaded in either order, it is important that the functionality for the logo be available to both loads. Thus, this is a situation where an ambiguity needs to be resolved in step 1622.

FIGS. 17A–17E illustrate five example scenarios which can be implemented to resolve an ambiguity uncovered in a step 1622. Each of these examples are now described. Referring now to FIG. 17A, the functionality contained in node 1412 is simply duplicated and it is assigned to each of loads 2 and 3. This implementation has the disadvantage of requiring the functionality to be downloaded in each of load 2 and load 3 regardless of whether that functionality was previously downloaded in the other of the two loads. Because storage space is not a concern typically on the server, the additional space consumed by the duplication of the node is typically not a concern.

In the example illustrated in FIG. 17B, the ambiguity presented by node 1412 is simply flagged as an error to the developer. In this case, the developer can resolve the ambiguity using any of the methods described herein, or the developer can simply redefine the scene graph to attempt to remove the ambiguous circumstance.

In the example illustrated in FIG. 17C, the functionality provided with node 1412 is reassigned so that it can be downloaded in a separate load, illustrated as load four. Alternatively, it can be reassigned such that it is included at the same time as either load 2 or load 3, whichever is first loaded. This is referred to as a preload. A similar, but slightly different approach is illustrated in FIG. 17D. In this approach, the functionality originally provided by node 1412 is moved to a grandparent node and assigned to the load of that grandparent. In this case, the functionality is then available regardless of the order in which loads 2 and 3 are accomplished.

Finally, in FIG. 17E, the system can keep track of whether the functionality was already loaded with one of the loads 2 and 3. In this case, if user interaction dictates that load 2 is loaded prior to load 3, when load 3 is downloaded, a different version, designated 3A, is provided which includes load 3 without the functionality originally provided in the ambiguous node. Similarly, if user interaction dictates that load 3 is downloaded, and this is followed by load 2, the version of load 2 provided in this instance is load 2A, which includes the functionality of load 2 without duplicating the functionality of node 1412 which was already provided in load 3. In this final example, slightly more storage space is required at the server and the server is also required to do a slightly greater amount of processing to insure that all of the functionality is provided. In some situations where server memory and processor resources are not as much of a concern, this implementation would be acceptable.

Because of the interactive nature of these processes, it is not always mandatory that loads be performed in a particular sequence. In other words, it is possible that load 3 may be downloaded to the user before load 2. Because of this desired flexibility, additional challenge is provided to the developer to insure that the required functionality is always present at the user's computer, while still minimizing or avoiding a duplication of functionality throughout a plurality of loads. To illustrate this concern more clearly, consider a simple example. In this example, it is desired that a banner ad be downloaded to a user's computer. The initial download of the banner ad includes the banner background, some simple text and a corporate logo. User interaction for the banner ad, for example by mousing over either one of two portions of the banner ad, will result in either one of two subsequent loads to be next downloaded. For example, the user mousing over the left portion of the banner ad may result in load 2 being downloaded, while mousing over the right portion of the banner ad results in load 3 being downloaded. Because the user is free to select this choice, loads 2 and 3 can be downloaded either individually, or in any order. However, in this example, both load 2 and load 3 provide a button in the banner ad. Because there was no button in the original ad sequence, the functionality for drawing the button, for providing text on the button, and for providing the functionality of allowing the button to be clicked, was not provided in the first minimal load. If load 2 is always forced to be provided before load 3, there is no ambiguity because the button functionality can be provided with load 2 and will always be there when load 3 is accessed. However, because in the scenario we have discussed, the order is not fixed, the button functionality must be provided with both loads 2 and load 3. Therefore, to avoid duplication of the functionality and to ensure that the functionality is available as required for either load 2 or load 3, additional challenges are provided to the developer and to the system in resolving ambiguities. In one embodiment, if an opcode tries to pass control to the sub-graph prior to completion of the loading, that opcode behaves as a no-op.

9. Example Computer Implementation

Figure 18:
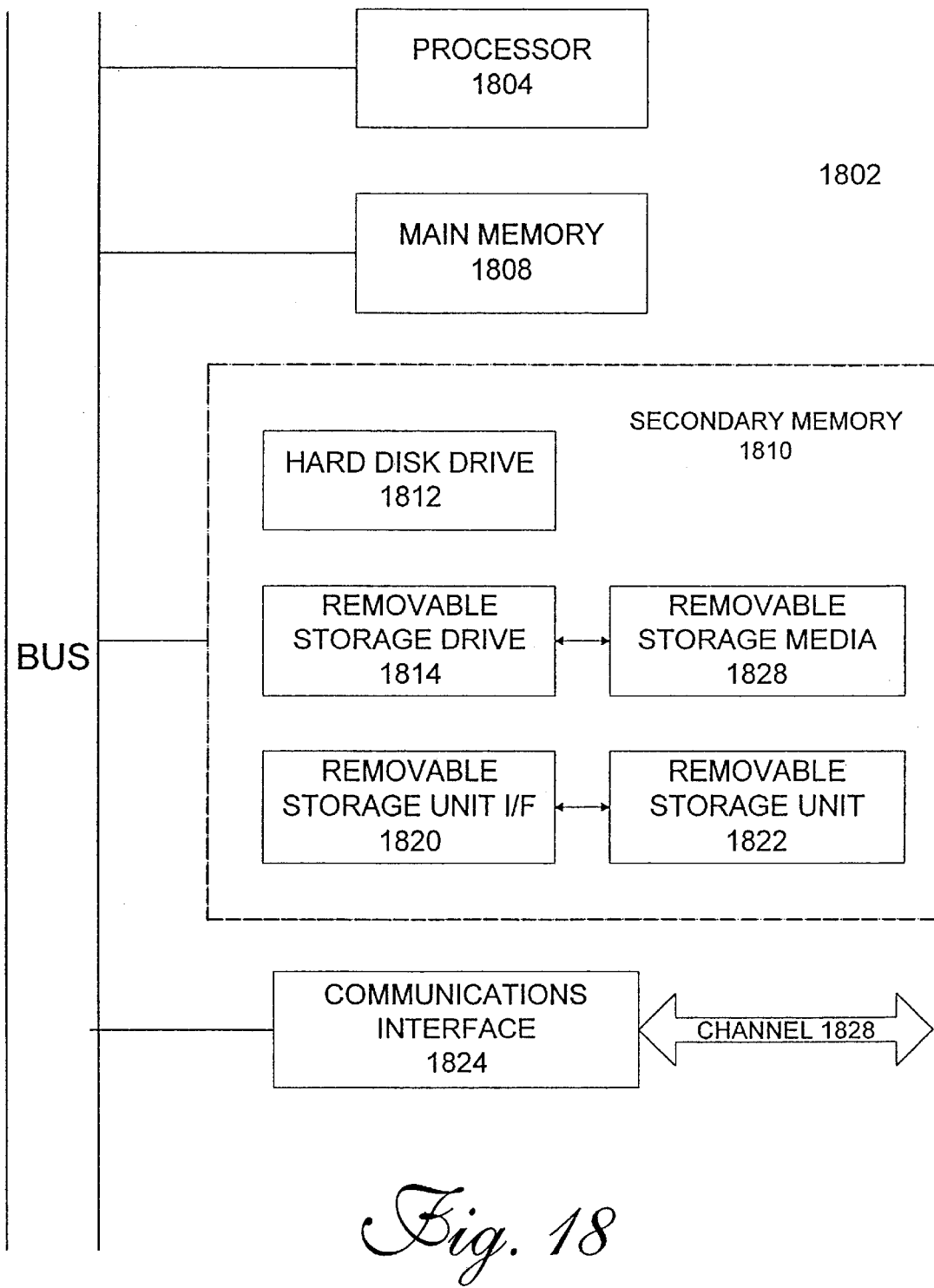
FIG. 18 is a block diagram illustrating an example computer system which can be used to implement the functionality described for the present invention.

The various embodiments of the invention described above may be implemented using hardware, software or a combination thereof and may be implemented in a computer system or other processing system. In fact, in one embodiment, these elements are implemented using a computer system capable of carrying out the functionality described with respect thereto. An example computer system 1802 is shown in FIG. 18. The computer system 1802 includes one or more processors, such as processor 1804. The processor 1804 is connected to a communication bus 1806. Various software embodiments are described in terms of this example computer system. After reading this description, it will become apparent to a person skilled in the relevant art how to implement the invention using other computer systems and/or computer architectures.

Computer system 1802 also includes a main memory 1808, preferably random access memory (RAM), and can also include a secondary memory 1810. The secondary memory 1810 can include, for example, a hard disk drive 1812 and/or a removable storage drive 1814, representing a floppy disk drive, a magnetic tape drive, an optical disk drive, etc. The removable storage drive 1814 reads from and/or writes to a removable storage medium 1818 in a well known manner. Removable storage media 1818, represents a floppy disk, magnetic tape, optical disk, etc. which is read by and written to by removable storage drive 1814. As will be appreciated, the removable storage media 1818 includes a computer usable storage medium having stored therein computer software and/or data.

In alternative embodiments, secondary memory 1810 may include other similar means for allowing computer programs or other instructions to be loaded into computer system 1802. Such means can include, for example, a removable storage unit 1822 and an interface 1820. Examples of such can include a program cartridge and cartridge interface (such as that found in video game devices), a removable memory chip (such as an EPROM, or PROM) and associated socket, and other removable storage units 1822 and interfaces 1820 which allow software and data to be transferred from the removable storage unit 1818 to computer system 1802.

Computer system 1802 can also include a communications interface 1824. Communications interface 1824 allows software and data to be transferred between computer system 1802 and external devices. Examples of communications interface 1824 can include a modem, a network interface (such as an Ethernet card), a communications port, a PCMCIA slot and card, etc. Software and data transferred via communications interface 1824 are in the form of signals which can be electronic, electromagnetic, optical or other signals capable of being received by communications interface 1824. These signals are provided to communications interface via a channel 1828. This channel 1828 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 1818, a hard disk installed in hard disk drive 1812, and signals on channel 1828. These computer program products are means for providing software to computer system 1802.

Computer programs (also called computer control logic) are stored in main memory and/or secondary memory 1810. Computer programs can also be received via communications interface 1824. Such computer programs, when executed, enable the computer system 1802 to perform the features of the present invention as discussed herein. In particular, the computer programs, when executed, enable the processor 1804 to perform the features of the present invention. Accordingly, such computer programs represent controllers of the computer system 1802.

In an embodiment where the elements are implemented using software, the software may be stored in a computer program product and loaded into computer system 1802 using removable storage drive 1814, hard drive 1812 or communications interface 1824. The control logic (software), when executed by the processor 1804, causes the processor 1804 to perform the functions of the invention as described herein.

In another embodiment, the elements are implemented primarily in hardware using, for example, hardware components such as application specific integrated circuits (ASICs). Implementation of the hardware state machine so as to perform the functions described herein will be apparent to persons skilled in the relevant art(s). In yet another embodiment, elements are implemented using a combination of both hardware and software.

10. Caching

As described above, one technique that is utilized to avoid having to recalculate the values each time a function is executed is to cache values and to reuse those values from the cache. One technique for implementing a cache is now described according to one embodiment of the invention. Generally speaking, as a scene graph is traversed and functions are executed, parameters for results of those functions are saved in a cache. In simple terms, because different executions of the function can yield different results, a different or unique cache is preferably created each time a function is called in a different way (i.e., from a different set of predecessors in the graph). Thus, if a previously obtained result is subsequently required, that result is available in one of potentially a plurality of caches. To illustrate, consider a simple example in which a function to used to color an object. Going one execution, the function colors the object red; the result which actually colors the object red is stored in a first cache. During subsequent execution of the function, if the function is to again color the object red, the function does not need to be executed again, instead the result can simply be retrieved from the cache and the processing can continue. If, on the other hand, the function this time colors the object yellow, a new cache is defined and the results of this execution of the function is stored in this new cache. As such, there are now two instances of the function results which can be utilized during subsequent operations. Simply writing the results of the operation coloring the object yellow over those stored in the first cache (the results of coloring the object red) would obviously render those results unavailable for subsequent operations in which the operation was again colored red. As such, such an approach is less desirable.

Figure 19:
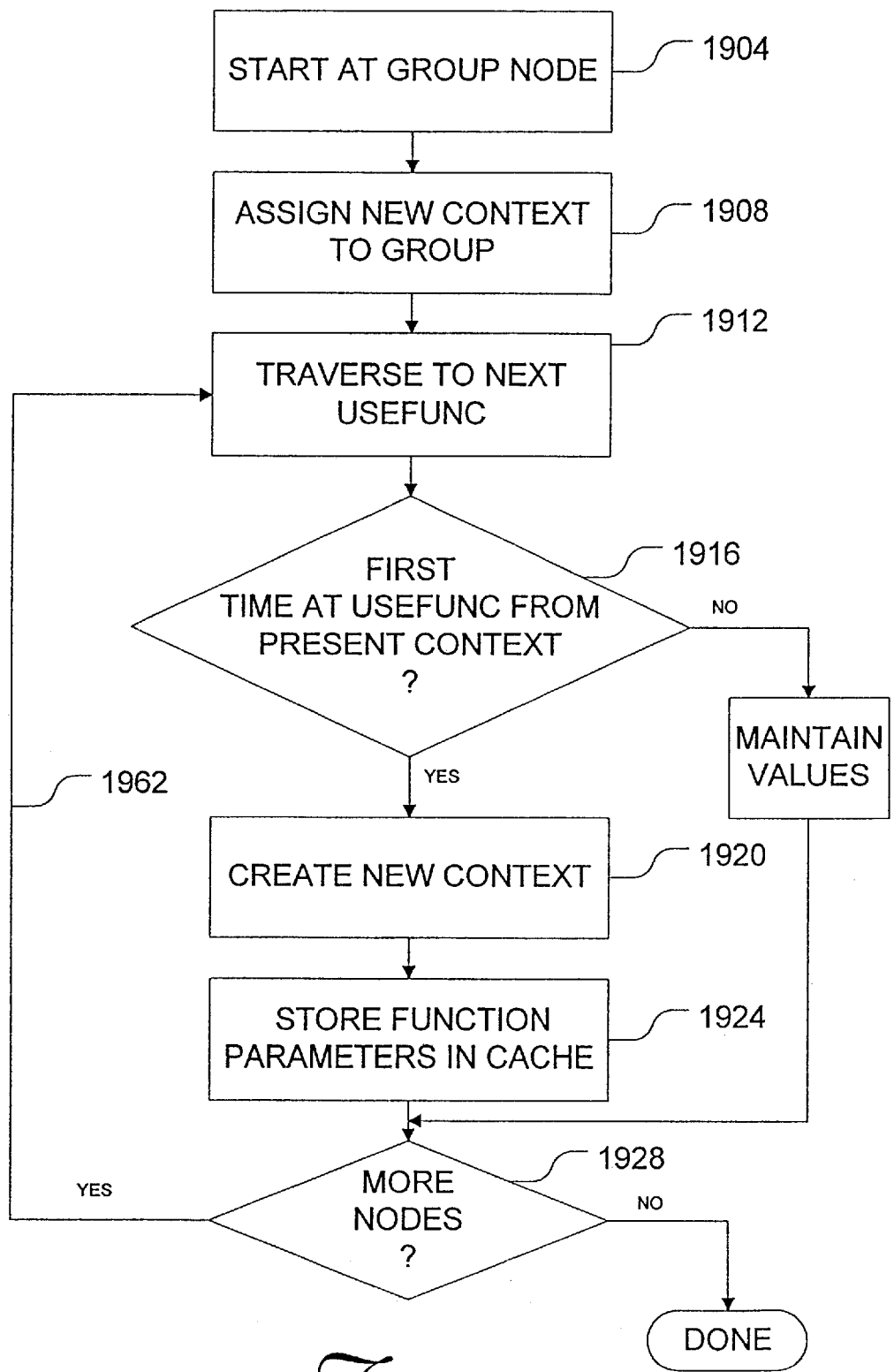
FIG. 19 is an operational flow diagram illustrating a method for creating caches according to one embodiment of the invention.

To illustrate this technique in which multiple caches are created, an example implementation is now described. FIG. 19 is an operation flow diagram illustrating a process for creating one or more caches in accordance with one embodiment of the invention. In the application in which this process is described, a scene graph includes the parent group node defining a group of functions as well as one or more USEFUNC nodes which implement a function node. Generally speaking, according to this technique, the scene graph is traversed and where a USEFUNC defines a function in a context which was previously undefined or unused, a new cache or context is identified to maintain those results.

Referring now to FIG. 19, in a step 1904 the operation begins at the group node of the scene graph; in a step 1908, a new context is assigned to this group node, the context defines a cache level. For purposes of illustration, this cache level is defined as cache 1 in this example description.

In a step 1912, the scene graph traversed to reach the first USEFUNC node in the scene graph. In a step 1916, it is determined whether this USEFUNC node has been traversed before. Specifically, a cache for that USEFUNC is examined to determine whether this USEFUNC node has been traversed from the first context. If it is the first time that this USEFUNC node has been traversed from the present context, a new context for that USEFUNC is defined in a step 1920. More specifically, a new context is associated with the cache for that USEFUNC. In a step 1924, the function referred to by that USEFUNC is invoked using the new context and the parameters obtained from invocation of that function are stored in the cache to find in step 1920. The process continues in this manner until each of the nodes have been traversed and the needed caches have been defined in the appropriate context. This is generally illustrated by decision box 1928 and flow line 1962. If during the traversal of the scene graph, a USEFUNC node is encountered which has already been examined from the existing context, the existing context can be maintained and there is no need to create a new context for that USEFUNC node. This is illustrated by decision step 1916 and step 1932.

Figure 20:
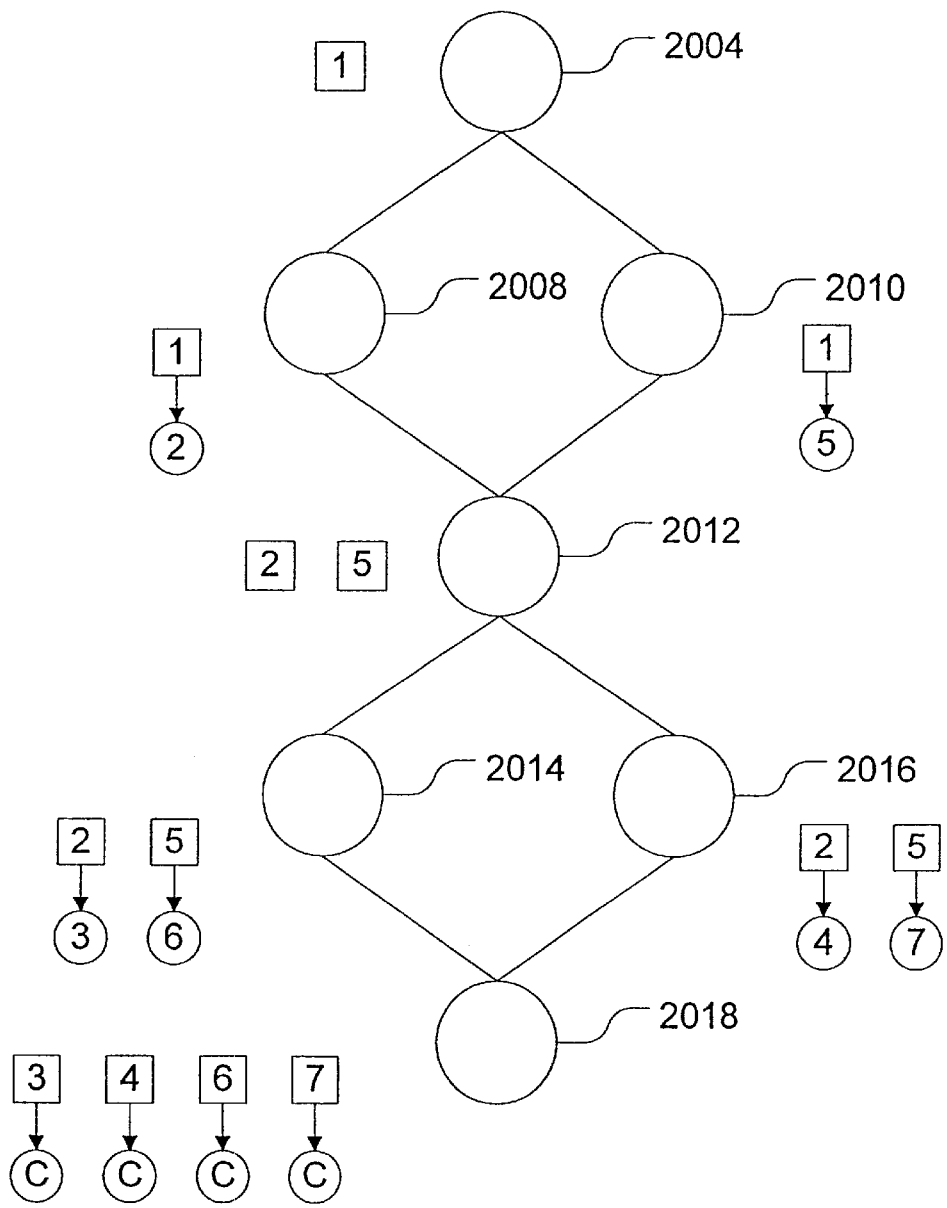
FIG. 20 is a diagram illustrating an example of caches created for an example scene graph according to one embodiment of the invention.

To better illustrate this process described with reference to FIG. 19, it is now described in terms of a simple example. This simple example is illustrated in FIG. 20. In the example illustrated in FIG. 20, a scene graph includes a group node 2004 having two USEFUNC nodes 2008, 2010, each of which invoke a function node 2012. Function 2012 in turn invokes two additional use function nodes 2014, 2016, which each invoke a last function node 2018. To help illustrate the process, assume that function node 2018 colors an object an identified color. Traversal of the graph begins at group node 2004. A new context, or cache level, is defined for group node 2004. In one example, this can defined as context 1, for example. Of course, other identifiers can be utilized.

Traversal of the graph leads first to USEFUNC node 2008. At USEFUNC node 2008, the system determines whether there is a cache established for USEFUNC node 2008 which refers to the first context. If not, a new context is defined for USEFUNC node 2008 and stored in the cache for context 1. In the illustrated example, this is identified as context 2. Results of function node 2012 can be stored in the cache for context 2.

Continuing traversal of the example scene graph USEFUNC node 2014 is next examined. In this traversal, it is determined whether USEFUNC node 2014 has been examined from context 2. If not, a new cache is created for USEFUNC node 2014 in context 2. In the example illustrated, this is defined as context 3. As such, the results of executing the color function at node 2018 in this context are stored at the cache for context 3. The operation then continues by examining the USEFUNC node 2016 to determine whether this node has ever been arrived at from context 2. If not, a new cache is created for USEFUNC node 2016 in context 2. In the example illustrated, this is context 4. Color values determined by 2018 as a result of the USEFUNC node 2016 arrived at in context 2 can be stored at the cache for context 4.

In one embodiment, the operation is not yet complete as USEFUNC nodes 2014, 2016 can still be arrived at by USEFUNC node 2010. Additionally, traversal of the scene graph has not yet brought the operation to USEFUNC node 2010. As such, in a next step, USEFUNC node 2010 is examined to determine whether it has been arrived at from context 1. In this example it has not and therefore a new cache is created for USEFUNC node 2010 in context 1. This is defined as context 5. Results of executions of function 2012 arrived at through USEFUNC node 2010 in context 1 are stored at the cache for context 5.

USEFUNCnode 2014 is now examined and is determined that this node nas never been traversed from context 5. As such, a new cache is defined for USEFUNC node 2014 in context 6. Similarly, USEFUNC 2016 is examined to determine whether it has ever been traversed from context level 5. Since, in this example, it has not, a new cache is created for USEFUNC node 2016 at context 7.

Thus, node 2018 can have color results, C, for four contexts, 3, 4, 6, and 7. Note that nodes 2004 and 2018 can have caches associated therewith.

By way of this simple example, the identification of a unique cache for each function which is called with a unique set of data is illustrated.

11. Conclusion

While various embodiments of the invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A method for enabling the efficient rendering of an animation sequence of a client, comprising:

downloading a nanokernel to a client, said nanokernel including an animation function and being used to interpret encoded functions at a client;

creating a first encoded function, said first encoded function including an operation code identifying said animation function, said first encoded function further identifying arguments to be used in executing said animation function;

creating a second encoded function that enables said nanokernel to specify an argument list for each animation sequence in which said first encoded function is called, said argument list including arguments associated with said first encoded function; and creating a third encoded function that enables said nanokernel to copy at least one of said arguments from said argument list into said arguments of said first encoded function;

wherein said arguments in said argument list can be altered to alter the animation sequence during subsequent iterations without creating an additional instance of said first encoded function.

2. The method of claim 1, wherein said at least one of said arguments to be copied by said nanokernel from said argument list is an array.

3. The method of claim 1, further comprising creating a fourth encoded function, said fourth encoded function enabling said nanokernel to specify an alternate argument list, wherein at least one argument in said alternate argument list is used in subsequent executions of said first encoded function.

4. The method of claim 3, wherein said third encoded function enables said nanokernel to copy at least one of said arguments from said alternate argument list into said arguments of said first encoded function.

5. The method of claim 1, wherein:

said nanokernel is capable of executing said first encoded function to obtain one or more results of said first encoded function; and said nanokernel is capable of installing at least one of said one or more results into a fourth encoded function as arguments for said fourth encoded function.

6. The method of claim 5, wherein said nanokernel is capable of repeating said executing and installing for one or more subsequent executions of said first encoded function.

7. The method of claim 1, wherein each of said encoded functions is associated with a node.

8. The method of claim 7, wherein said second encoded function identifies said node associated with said third encoded function.

9. The method of claim 7, wherein said third encoded function identifies said node associated with said arguments identified by said first encoded function.

10. The method of claim 1, wherein said second encoded function identifies said third encoded function.

11. The method of claim 1, wherein said third encoded function identifies said arguments identified by said first encoded function.

12. The method of claim 1, wherein said third encoded function identifies a particular one of said arguments in said argument list.

13. The method of claim 1, wherein said third encoded function identifies more than one of said arguments in said argument list.

14. A computer data signal embodied in a transmission medium for enabling a computer system to efficiently render an animation sequence at a client, said computer data signal comprising:

a nanokernel, said nanokernel including an animation function and being used to interpret encoded functions at a client;

a first encoded function, said first encoded function including an operation code identifying said animation function, said first encoded function further identifying arguments to be used in executing said animation function;

a second encoded function that enables said nanokernel to specify an argument list for each animation sequence in which said first encoded function is called, said argument list including arguments associated with said first encoded function;

a third encoded function that enables said nanokernel to copy at least one of said arguments from said argument list into said arguments of said first encoded function;

wherein said arguments in said argument list can be altered to alter the animation sequence during subsequent iterations without creating an additional instance of said first encoded function.

15. The computer data signal of claim 14, wherein said at least one of said arguments to be copied by said nanokernel from said argument list is an array.

16. The computer data signal of claim 14, further comprising a fourth encoded function, said fourth encoded function enabling said nanokernel to specify an alternate argument list, wherein at least one argument in said alternate argument list is used in subsequent executions of said first encoded function.

17. The computer data signal of claim 16, wherein said third encoded function enables said nanokernel to copy at least one of said arguments from said alternate argument list into said arguments of said first encoded function.

18. The computer data signal of claim 14, wherein:

said nanokernel is capable of executing said first encoded function to obtain one or more results of said first encoded function; and said nanokernel is capable of installing at least one of said one or more results into a fourth encoded function as arguments for said fourth encoded function.

19. The computer data signal of claim 18, wherein said nanokernel is capable of repeating said executing and installing for one or more subsequent executions of said first encoded function.

20. The computer data signal of claim 14, wherein each of said encoded functions is associated with a node.

21. The computer data signal of claim 20, wherein said second encoded function identifies said node associated with said third encoded function.

22. The computer data signal of claim 20, wherein said third encoded function identifies said node associated with said arguments identified by said first encoded function.

23. The computer data signal of claim 14, wherein said second encoded function identifies said third encoded function.

24. The computer data signal of claim 14, wherein said third encoded function identifies said arguments identified by said first encoded function.

25. The computer data signal of claim 14, wherein said third encoded function identifies a particular one of said arguments in said argument list.

26. The computer data signal of claim 14, wherein said third encoded function identifies more than one of said arguments in said argument list.

27. A apparatus for enabling the efficient rendering of an animation sequence at a client, comprising:

means for downloading a nanokernel to a client, said nanokernel including an animation function and being used to interpret encoded functions at a client;

means for creating a first encoded function, said first encoded function including an operation code identifying said animation function, said first encoded function further identifying arguments to be used in executing said animation function;

means for creating a second encoded function that enables said nanokernel to specify an argument list for each animation sequence in which said first encoded function is called, said argument list including arguments associated with said first encoded function; and means for creating a third encoded function that enables said nanokernel to copy at least one of said arguments from said argument list into said arguments of said first encoded function;

means for wherein said arguments in said argument list can be altered to alter the animation sequence during subsequent iterations without creating an additional instance of said first encoded function.

28. A computer program product for enabling a processor in a computer system to implement a system for enabling the efficient rendering of an animation sequence at a client, said computer program product comprising:

a computer usable medium having computer readable program code means embodied in said computer usable medium for causing a program to execute on the computer system, said computer readable program code means comprising:

means for enabling the computer system to download a nanokernel to a client, said nanokernel including an animation function and being used to interpret encoded functions at a client;

means for enabling the computer system to create a first encoded function, said first encoded function including an operation code identifying said animation function, said first encoded function further identifying arguments to be used in executing said animation function;

means for enabling the computer system to create a second encoded function that enables said nanokernel to specify an argument list for each animation sequence in which said first encoded function is called, said argument list including arguments associated with said first encoded function; and means for enabling the computer system to create a third encoded function that enables said nanokernel to copy at least one of said arguments from said argument list into said arguments of said first encoded function;

wherein said arguments in said argument list can be altered to alter the animation sequence during subsequent iterations without creating an additional instance of said first encoded function.

29. The computer program product of claim 28, wherein said at least one of said arguments to be copied by said nanokernel from said argument list is an array.

30. The computer program product of claim 28, further comprising means for enabling the computer system to create a fourth encoded function, said fourth encoded function enabling said nanokernel to specify an alternate argument list, wherein at least one argument in said alternate argument list is used in subsequent executions of said first encoded function.

31. The computer program product of claim 30, wherein said third encoded function enables said nanokernel to copy at least one of said arguments from said alternate argument list into said arguments of said first encoded function.

32. The computer program product of claim 28, wherein:

said nanokernel is capable of executing said first encoded function to obtain one or more results of said first encoded function; and said nanokernel is capable of installing at least one of said one or more results into a fourth encoded function as arguments for said fourth encoded function.

33. The computer program product of claim 32, wherein said nanokernel is capable of repeating said executing and installing for one or more subsequent executions of said first encoded function.

34. The computer program product of claim 28, wherein each of said encoded functions is associated with a node.

35. The computer program product of claim 34, wherein said second encoded function identifies said node associated with said third encoded function.

36. The computer program product of claim 34, wherein said third encoded function identifies said node associated with said arguments identified by said first encoded function.

37. The computer program product of claim 28, wherein said second encoded function identifies said third encoded function.

38. The computer program product of claim 28, wherein said third encoded function identifies said arguments identified by said first encoded function.

39. The computer program product of claim 28, wherein said third encoded function identifies a particular one of said arguments in said argument list.

40. The computer program product of claim 28, wherein said third encoded function identifies more than one of said arguments in said argument list.

* * * * *